(12) United States Patent
Rao et al.

(10) Patent No.: US 10,592,844 B2
(45) Date of Patent: Mar. 17, 2020

(54) MANAGING NOTIFICATIONS OF A DELIVERY METHOD BASED ON AN ACTIVE DEVICE

(71) Applicant: Amazon Technologies, Inc., Seattle, WA (US)

(72) Inventors: Raghuram Satyanarayana Rao, Seattle, WA (US); Chinmay Hemant Bhagwat, Issaquah, WA (US); Alan Kipust, Mercer Island, WA (US); Pragyana K. Mishra, Seattle, WA (US); Debanjan Mukherjee, San Jose, CA (US); Thomas Matthew Ryle, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 700 days.

(21) Appl. No.: 14/869,117

(22) Filed: Sep. 29, 2015

(65) Prior Publication Data
US 2017/0091708 A1    Mar. 30, 2017

(51) Int. Cl.
*G06Q 10/08*    (2012.01)
*H04W 84/12*    (2009.01)

(52) U.S. Cl.
CPC ......... *G06Q 10/0833* (2013.01); *H04W 84/12* (2013.01)

(58) Field of Classification Search
CPC .................. G06Q 10/0833; H04W 84/12
See application file for complete search history.

(56) References Cited

U.S. PATENT DOCUMENTS

| | | | |
|---|---|---|---|
| 6,975,998 B1 * | 12/2005 | Jones ................. | G06Q 10/0631 198/434 |
| 9,875,455 B2 * | 1/2018 | Cassady ............. | G06Q 10/0836 |
| 2007/0050200 A1 * | 3/2007 | Kampert ............ | G06Q 10/0833 705/404 |
| 2008/0061966 A1 | 3/2008 | Nelson | |
| 2008/0255758 A1 | 10/2008 | Graham et al. | |
| 2012/0158606 A1 | 6/2012 | Moudy | |
| 2012/0246077 A1 * | 9/2012 | Skaaksrud ......... | G06Q 30/0615 705/50 |

(Continued)

FOREIGN PATENT DOCUMENTS

| | | | |
|---|---|---|---|
| WO | 2011038018 | 3/2011 | |
| WO | WO2011038018 A1 * | 3/2011 | ............ G08G 1/123 |

OTHER PUBLICATIONS

"Hongjun Song, E-Services at FedEx, Jun. 2003, p. 45-46" (Year: 2003).*

(Continued)

*Primary Examiner* — Kevin H Flynn
*Assistant Examiner* — Ibrahim N El-Bathy
(74) *Attorney, Agent, or Firm* — Kilpatrick Townsend & Stockton LLP

(57) ABSTRACT

Techniques for managing notifications may be described. In an example, the notifications may relate to an item and may be provided to a user device. An active device may be associated with the item. The active device may store a token for communication with a local area network associated with a location. Based on the communication, a determination may be made that the item may be in proximity to the location. Corresponding notifications may be sent to the user device.

20 Claims, 11 Drawing Sheets

(56) References Cited

U.S. PATENT DOCUMENTS

| | | | |
|---|---|---|---|
| 2013/0103606 A1 | 4/2013 | Holliday et al. | |
| 2013/0261792 A1* | 10/2013 | Gupta | G06Q 10/08 700/232 |
| 2014/0068744 A1 | 3/2014 | Bran et al. | |
| 2015/0349917 A1* | 12/2015 | Skaaksrud | G06Q 10/0833 370/328 |
| 2016/0292635 A1* | 10/2016 | Todasco | G06Q 10/0833 |
| 2016/0343220 A1* | 11/2016 | Grabham | G08B 13/1472 |
| 2017/0353943 A1 | 12/2017 | Skaaksrud | |

OTHER PUBLICATIONS

U.S. Appl. No. 14/869,145, filed Sep. 29, 2015, Titled: Managing Notifications of a Delivery Method Based on a Passive Device.
PCT/US2016/054505, "International Search Report and Written Opinion", dated Jan. 24, 2017, 14 pages.
PCT/US2016/054505, "International Preliminary Report on Patentability", dated Apr. 12, 2018, 10 pages.
EP16784628.6, "Office Action," dated Jan. 25, 2019, 8 pages.
AU2016330891, "First Examination Report," dated Mar. 27, 2019, 4 pages.
Pradhan, "Wi-Fi Aware—Another Entry into the Proximity Technology Field", Available online at URL:https://www.softwebsolutions.com/resources/wifi-proximity-marketing-solutions.html, Jul. 28, 2015, pp. 1-7.
AU2016330891, "Second Examination Report," dated May 24, 2019, 5 pages.
EP16784628.6, "Office Action", dated Jul. 16, 2019, 8 pages.
AU2016330891, "Third Examination Report," dated Dec. 23, 2019, 4 pages.

\* cited by examiner

| Phase: | Preparation | In-Route | Drop-Off | Pick-Up |
|---|---|---|---|---|
| Interacting Components: | Passive Device | -Passive Device<br>-Delivery Device | -Passive Device<br>-Delivery Device<br>-Delivery Mgmt Device | -Passive Device<br>-Delivery Mgmt Device<br>-User Device |
| End User Device Notification: | Order Processing | -Delivery Start<br>-Item location | -Drop-off Completion<br>-Drop-off Time<br>-Environmental conditions<br>-Item location | -Item Movement<br>-No Movement<br>-Item Pick-up<br>-Environmental conditions<br>-Item location |
| Delivery Device Notification: | Order Processing | Delivery Instructions | -Delivery Instructions<br>-Location of Delivery Mgmt Device<br>-Virtual Handoff | -Item Movement<br>-Item pick up<br>-Environmental conditions |

FIG. 3

| Phase: | Preparation | In-Route | Drop-Off | Pick-Up |
|---|---|---|---|---|
| Interacting Components: | Active Device | -Active Device<br>-Delivery Device | -Active Device<br>-Delivery Device<br>-LAN | -Active Device<br>-LAN<br>-User Device |
| End User Device Notifications: | Order Processing | -Delivery Start<br>-Item Location | -Drop-off Completion<br>-Drop-off Time<br>-Environmental Condition<br>-Item Location | -Item Movement<br>-No Movement<br>-Item Pick-up<br>-Environmental Condition<br>-Item Location |
| Delivery Device Notifications: | Order Processing | Delivery Instructions | -Delivery Instructions<br>-Virtual Handoff | -Item Movement<br>-Item Pick-up<br>-Environmental Condition |

FIG. 5

MANAGING NOTIFICATIONS OF A DELIVERY METHOD BASED ON AN ACTIVE DEVICE

BACKGROUND

More and more users are turning to network-based resources, such as web-based resources that may utilize the Internet, to order items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user device and a network-based resource may interact to exchange information about items. The interactions may include notifications provided to the user device. A notification may relate to an item, such as a delivery status of the item. The number, content, and timings of the notifications may affect the user experience, network bandwidth, processing of network-based resource, and/or processing of the user device.

BRIEF DESCRIPTION OF THE DRAWINGS

Various embodiments in accordance with the present disclosure will be described with reference to the drawings, in which:

FIG. 3 illustrates example notifications available from a computing environment utilizing a destination delivery management device, according to particular embodiments;

FIG. 5 illustrates example notifications available from a computing environment utilizing an active device, according to a particular embodiment;

DETAILED DESCRIPTION

Figure 1:
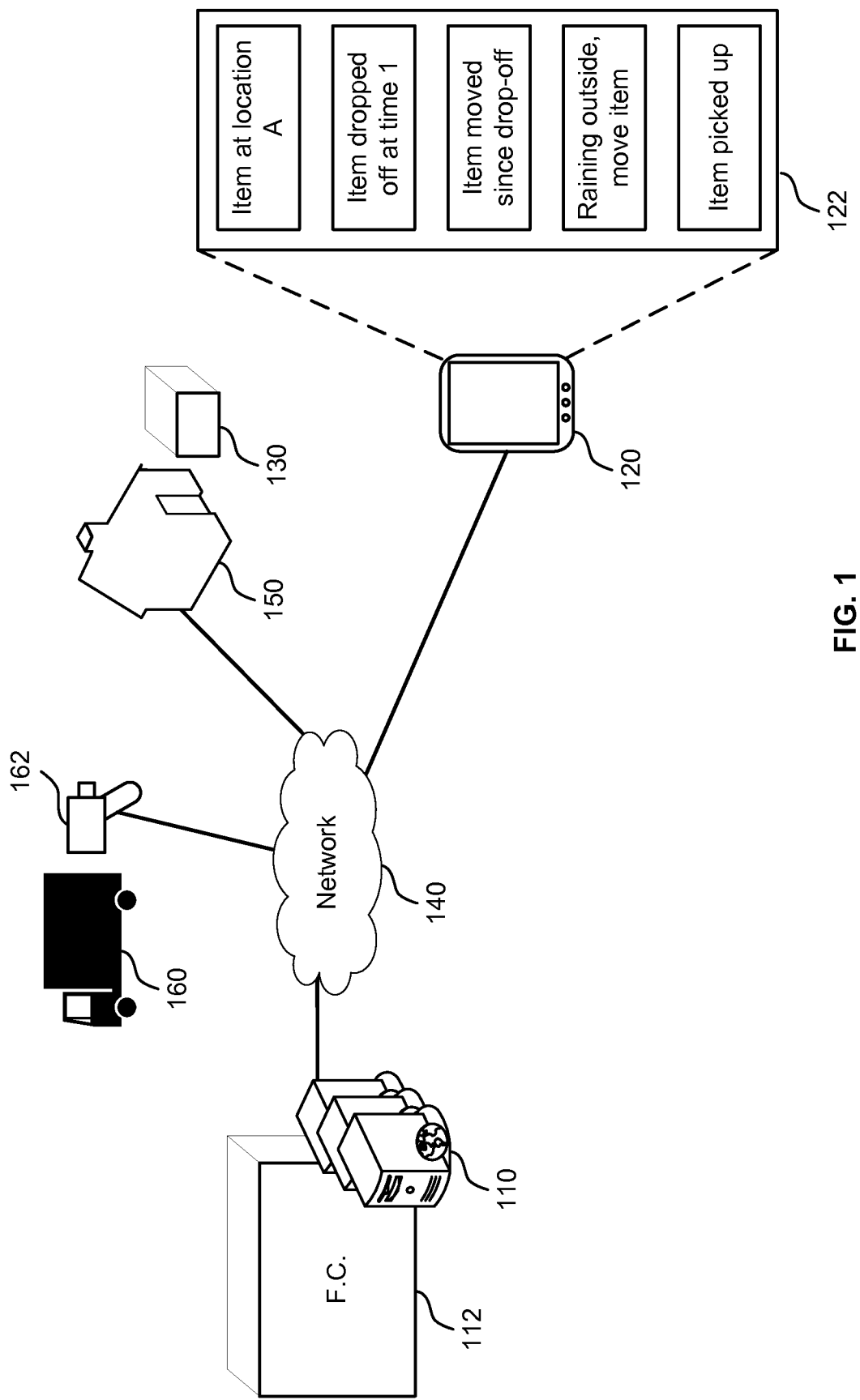
FIG. 1 illustrates an example computing environment where notifications may be transmitted, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to managing notifications within a computing environment. In an example, the computing environment may include a network-based resource accessible to a user device over a network. The network-based resource may be configured to provide notifications to the user device. The notifications may relate to an item. Unlike many traditional computing environments, the notifications may be provided in real-time based on triggers (e.g., within a short period of time after an occurrence of a trigger). An example trigger may include a state or a change in the state of the item. Another example trigger may include a request from the user device. Regardless of the triggers, the notifications may be based on real-time data about the item. Because of the real-time data, the notifications may provide meaningful information about the item, rather than outdated or stale information. In addition, because of the triggers, only the necessary or desired number of notifications may be provided to the user device, rather than a flood of unnecessary or unwanted notifications. Accordingly, the user experience may be enhanced while also the usage of computing resources within the computing environment and the usage of the network bandwidth may be reduced. To trigger real-time notifications, the item may be associated with a notification device, such as a label capable of data exchange. The association may include a direct physical attachment between the item and the notification device or an indirect attachment through an intermediary holder. In turn, the notification device may be configured to connect to the network through various computing devices. Communications with the computing devices may trigger the notifications in real-time.

To illustrate, consider a first example of an electronic marketplace. A user may operate a user device to order, such as for rent or purchase, an item. The item may be delivered from a source to a destination via a delivery vehicle. A holder, such as a package, may retain the item for the delivery. A passive radio frequency identification (RFID) tag may be attached to the package and may uniquely identify the order. When loading the item onto the delivery vehicle, a handheld device may read the RFID tag. The handheld device may be connected over a network to a computer system of the electronic marketplace. The reading of the RFID tag may identify the item causing the handheld device to indicate to the computer system that the loading has occurred. In response, the computer system may send a notification about a start of the delivery to the user device. While the item is in route, the user device may access the computer system to request location information about the item. In response, the computer system may use the handheld device's and/or the delivery truck's global positioning system (GPS) data to estimate and provide the location information to the user device. Upon arrival to the destination, a computing device located at the destination may connect to the handheld device and/or read the RFID tag. The computing device may also connect to the computer system over a network and may have access to information about the order. Accordingly, the computing device may authorize the handheld device to drop-off the item at the destination and may cause a notification about the drop-off to be sent to the user device. Further, the computing device may be configured to determine movement and/or pick-up of the item. As such, once the item has been dropped-off, any movement and/or pick-up of the item may trigger a corresponding notification to be sent to the user device.

In another illustration, consider a second example of a same or a different electronic marketplace. In this example, an active 802.11 RFID tag may be utilized in lieu or in addition to the passive RFID tag. Upon arrival, the active 802.11 RFID tag may connect to a computing node (e.g., an access point or an intermediary computing device) of a local area network of the destination. The active 802.11 RFID tag and the computing node may utilize a token to establish communication. The token may be based on the order of the item. Similarly, the handheld device may communicate with the computing node. Based on the communication of the handheld device and/or the active 802.11 RFID tag with the computing node, the drop-off may be determined and the respective notification may be sent to the user device. Subsequent to the drop-off, the communication between the active 802.11 RFID tag and the computing node may be utilized to determine movement and/or pick-up of the item and to, accordingly, send the respective notifications to the user device.

In the interest of clarity of explanation, embodiments may be described herein in connection with an electronic marketplace. However, the embodiments may not be limited as such. Instead, the embodiments may similarly apply to any computing environment where notifications may be generated and provided. For example, the embodiments may similarly apply to an inventory system, a tracking system, and/or any other environment where notifications may be provided from computing resource to a user device, such as from a server to a client.

Turning to FIG. 1, the figure illustrates an example computing environment for providing notifications. In particular, the computing environment may include a computer system 110 and a user device 120 exchanging information about an item 130 over a network 140. In an example, the computer system 110 may facilitate functionalities of an electronic marketplace offering the item 130. The user device 120 may access the computer system 110 to order the item 130. Different order types may be supported such as purchasing, renting, leasing, selling, and/or returning the item 130. A delivery of the item from a source 112 to a destination 150 may be performed based on the order. The delivery may utilize a delivery vehicle 160. Notifications 122 about the item 130, such as ones related to the order and the delivery, may be provided to the user device 120. The notification 122 may be triggered by and/or may utilize real-time data. Each of these components is described herein next.

In the interest of clarity of explanation, the embodiments of the present disclosure may be described in connection with a delivery from the source 112 to the destination 150. This may correspond to, for example, a purchase of the item 130 for delivery to the destination 150. However, the embodiments are not limited as such. Instead, the embodiments may similarly apply to a delivery from the destination 150 to the source 112. This may correspond to, for example, a return or a sale of the item 130 for delivery to the source 112.

In an illustrative example, the source 112 may represent a fulfillment center (F.C.) associated with the electronic marketplace. The fulfillment center may include a warehouse, a storage facility, or some other source from which the item may be available or to which the item may be returned. Generally, the electronic marketplace may offer and facilitate orders and deliveries of the item (or units thereof) from and to the source 112.

The destination 150 may represent a location to which the item 130 may be delivered (or, conversely, from which the item 130 may be picked up). For instance, the destination 150 may represent a house, a store, a street intersection, or other delivery locations. Further, the destination 150 may include a local area network of one or more computing nodes that may be, in turn, connected to the computer system 110 over the network 140.

The computer system 110 may include a number of computing resources, such as servers or a server farm, configured to facilitate the functionalities of the electronic marketplace. For example, the computer system 110 may host an electronic platform. The electronic platform may include a front end system, such as a web site of the electronic marketplace, to offer items and different delivery methods. A user operating a user device may interact with the front end system to order available items and select delivery methods. The electronic platform may also include a back end system to process and manage deliveries of items.

The user device 120 may include any suitable computing device capable of communicating with the computer system 110 over the network 140. For example, the user device 120 may include a number of general purpose personal computers, such as desktop or laptop computers running a standard operating system, as well as cellular, wireless, and handheld devices running mobile software and capable of supporting a number of networking and messaging protocols.

The network 140 may include any one or a combination of many different types of networks. For example, the network 140 may include any of wireless networks, cable networks, cellular networks, radio networks, the Internet, and other private and/or public networks.

The item 130 may be available from the electronic marketplace and may include a tangible item (e.g., a physical item such as a camera or a multimedia file) or an intangible item (e.g., a service to be provided at the destination 150). As part of the delivery, the item 130 may be held in a holder, such as in a suitable package. Suitable packages exemplified by item 130 may include a box, a bin, a tote, a bag, or another receptacle of proper structure and material.

The delivery vehicle 160 may represent a vehicle for delivering the item 130 from the source 112 to the destination 150. The delivery vehicle 160 may be manually, remotely, semi-autonomously, or autonomously operated and may include a ground, air, and/or water-based vehicle. In addition, the delivery vehicle 160 may connect to the computer system 110, the user device 120, and/or the destination 150 (e.g., a computing node at the destination 150) over the network 140.

Further, a delivery device 162 may be associated with the delivery vehicle or an operator of the delivery vehicle. For instance, the delivery device 162 may be integrated with the delivery vehicle 160 or may be a handheld device that may be stored at and utilized in conjunction with the delivery vehicle 160. The delivery device 162 may include a computing device that may connect to the computer system 110, the user device 120, and/or the destination 150 (e.g., a computing node at the destination 150) over the network 140. In addition, the delivery device 162 may include different interfaces related to the delivery of the item 130. One example interface may include a reader for accessing information about the item 130 (e.g., a reader that may interact with a tag attached to the holder of the item). Another example interface may include an interface configured to provide, such as to display to an operator and/or transmit to the delivery vehicle 160, delivery instructions and to receive responses to the delivery instructions from the operator and/or delivery vehicle 160.

The user device 120 may receive the notification(s) 122 from the computer system 110, the destination 150 (e.g., a computing node at the destination 150), the delivery vehicle 160, and/or the delivery device 162 over the network 140 (or some other network). Generally, the notifications 122 may provide information about the item 130, such as about the order and/or the delivery thereof. In an example, a notification may include information about a location of the item, a time associated with the location of the item, a state of the item, the order, and/or delivery. Some of the notifications 122 may be triggered by a change of the state of the item 130, the order, and/or the delivery. Other notifications 122 may be requested by the user device 120 from the computer system 110, the destination 150 (e.g., a computing node at the destination 150), the delivery vehicle 160, and/or the delivery device 162. FIG. 1 illustrates five notifications 122, although a different number of notifications 122 may exist. Each of the five notifications 122 may have been provided in real-time to the user device 120 (e.g., within a short period of time after occurrence of a respective trigger). A first notification may correspond to the item 130 arriving to a location "A," such as when the item 130 may have been loaded onto the delivery vehicle 160 which may represent a start of the delivery. A second notification may correspond to the item being dropped off at the destination 150. A third notification may describe that the item 130 may have been moved since the drop-off. A fourth notification may describe an environment condition at the destination 150 and may recommend a corresponding action related to the delivery (e.g., to move the item 130 because of rain). A fifth notification may indicate that the item 130 may have been picked up.

To provide the notifications 122, a tag may be attached to the item 130 and/or to the holder of the item 130. A proximity of the tag with the delivery device 162 and/or the destination 150 (e.g., a computing node of the destination 150) may trigger the notifications. In an example, the proximity may be based on wired, wireless, radio frequency (RF), optical, and/or other type of communications between the tag, the delivery device 162, and/or the destination 150.

Figure 2:
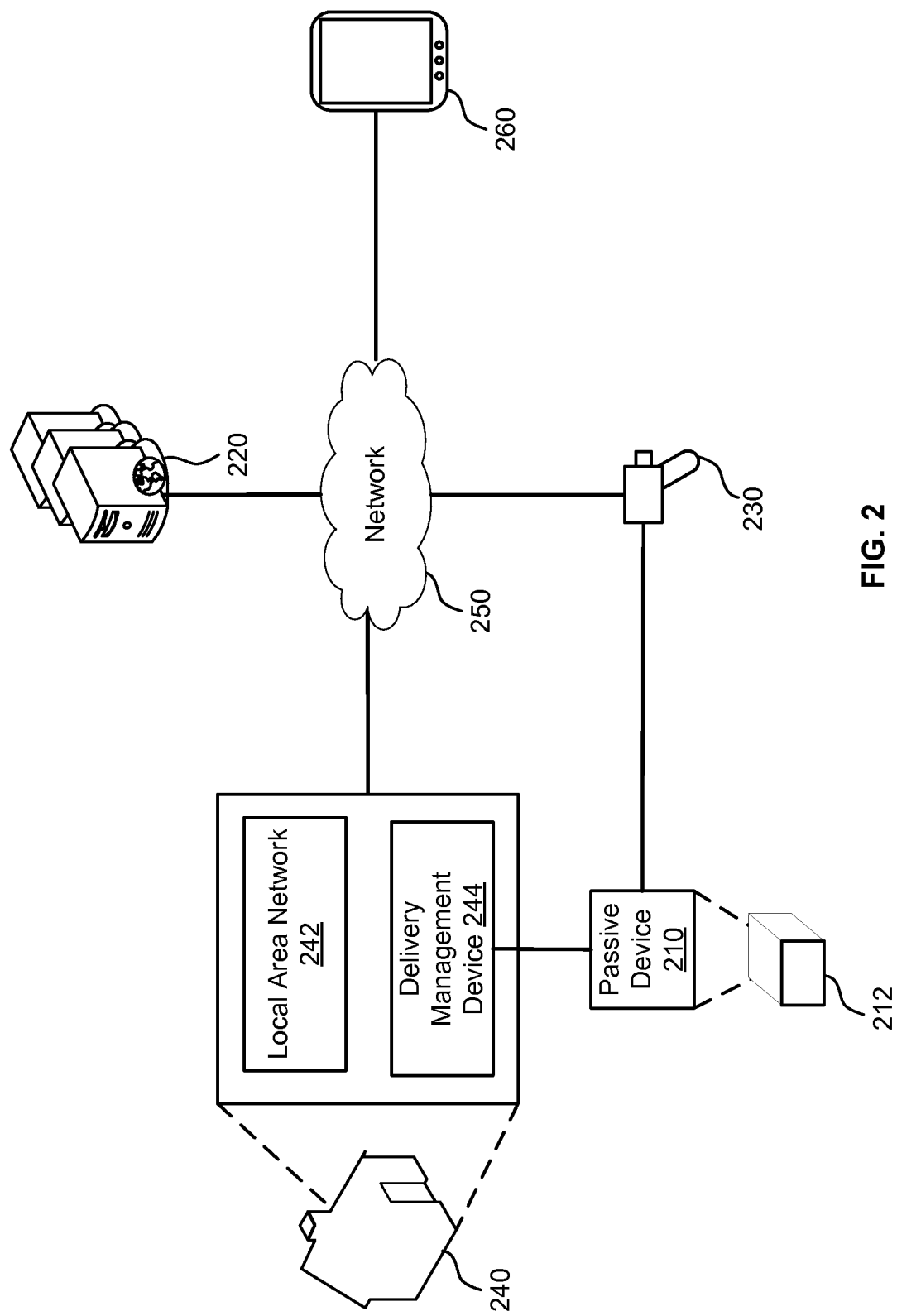
FIG. 2 illustrates an example computing environment that may utilize a destination delivery management device, according to a particular embodiment.
Figure 4:
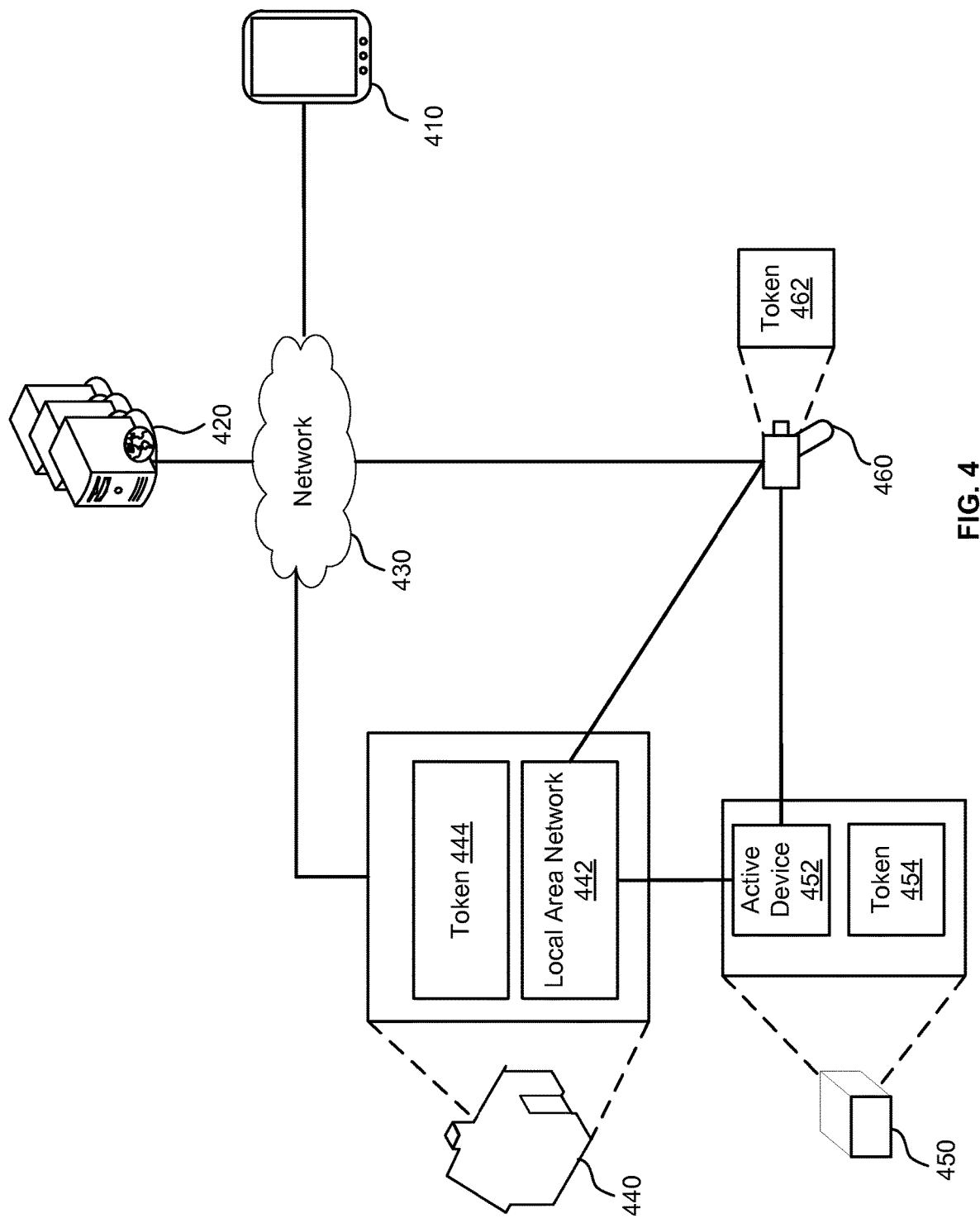
FIG. 4 illustrates an example computing environment that may utilize an active device, according to a particular embodiment.

Different embodiments of the tag may be implemented. Generally, the embodiments may balance between cost, processing capabilities, and/or power consumption of the tag versus cost and/or processing capabilities of the delivery device 162 and/or of the computing node of the destination 150. FIG. 2 illustrates an example of a tag as a passive device, where the cost, processing capabilities, and power consumption of the passive device may be reduced. Instead, processing related to the notifications may be pushed to the delivery device 162 and/or the computing node of the destination 150. In comparison, FIG. 4 illustrates an example of an active device as an implementation of the tag. In this example, some of the cost, processing, and/or power may be pushed to the active device.

An example of the passive device is illustrated in FIG. 2. In particular, a passive device 210 may be attached, via adhesion or some other attachment means, to a holder 212 of an item (or to the item itself). The passive device 210 may represent a printable passive RFID tag that may encode information, such as a unique identifier(s), about the item, the delivery (e.g., delivery location and/or delivery instructions), and/or an order of the item. Other types of passive devices may be used. For example, one or two dimensional barcodes may be used.

Upon the order of the item, a computer system 220, similar to the computer system 110 of FIG. 1, may provide instructions for configuring the passive device 210. The instructions may include the information to be encoded in the passive device 210. Once configured (e.g., printed in the case of a printable passive RFID tag), the passive device 210 may be attached to the holder 212. Further, the computer system 220 may provide some or all of the encoded information to a delivery device 230 and/or the destination 240 (e.g., to a computing node thereof). The delivery device 230 and the destination 240 may be similar to the delivery device 162 and the destination 150 of FIG. 1, respectively. The information may be pushed or transmitted upon request over a network 250.

The destination 240 may include a local area network 242, such as a wireless local network interconnecting various computing nodes located at the destination 240 (e.g., inside or within a geographical fence of the destination 240). The local area network 242 may also be connected to the network 250 such that a communication path may exist between the computing nodes and the computer system 220, the delivery device 230, and/or a user device 260. These computing nodes may include, for example, an access point, a router, and/or other computing resources. In addition, the computing nodes may include a delivery management device 244. The delivery management device 244 may represent a computing device that may be configured to manage part of the delivery of the item to and/or from the destination 240 (e.g., a drop-off and/or a pick-up at the destination 240).

In an example, the delivery management device 244 may include a processor, a memory, and other computing components implemented in hardware and software. These computing components may include, for instance, a GPS receiver, a radio frequency (RF) transceiver, a wireless or wired data interface, a user interface, a weight sensor, a pressure sensor, an optical sensor, an environment sensor (e.g., a rain sensor), and/or a delivery management module. The delivery management module may be configured to request and/store information about the passive device 210, the computer system 220, the item, the delivery, the delivery device 230, and/or the user device 260 and to manage interactions with the passive device 210, the computer system 220, the delivery device 230, and/or the user device 260. These interactions may use the various components of the delivery management device 244.

Other configurations of the delivery management device 244 may be used. For example, some of the components, whether hardware or software, may be pushed to other computing nodes of the local area network or to the computer system 220. For instance, the delivery management device 244 may include an interface for interfacing with the delivery device 230 (e.g., an RFID tag, a barcode, etc.), a processor, a memory, and a wireless transceiver to interface with the local area network 242. In this configuration, the delivery management device 244 may facilitate data exchange between the delivery device 230 and a computing node(s) of the local area network 242. As such, much of the processing may be distributed between the delivery device 230 and the computing node rather than being performed locally by delivery management device 244.

In operation, various notifications may be generated based on proximity of the different components. These notifications may relate to events associated with the delivery. For example, the notifications may include information about different delivery events upon occurrences of such events including a start of the delivery, a drop-off of the item, a movement of the item, and/or a pick-up of the item.

Upon a start of the delivery, the delivery device 230 may interact with the passive device 210 to receive information therefrom. The interaction may depend on the implementation of the passive device 210. For instance, the delivery device 230 may radiate a passive RFID tag with RF energy and receive an RF signal in response from the passive RFID tag. In an example, upon interacting with the passive device 210, the delivery device 230 may send the information included in the RF signal to the computer system 220 that may, in turn, send a notification about the start of the delivery to the user device 260. In another example, the delivery device 230 may send the notification to the user device 260 independently of the computer system 220.

While in route to the destination 240, the computer system 220 may receive the GPS location of the passive device 210 and/or the delivery device 230 and may provide such information to the user device 260. Upon arrival at the destination 240, the delivery device 230 may access the GPS location of the delivery management device 244, thereby allowing the delivery device 230 to move to a proximity of the delivery management device 244.

Once in proximity, various types of notifications may be generated based on the interactions of the delivery management device 244 with the passive device 210, the holder 212, and/or the delivery device 230. The interactions may be triggered by a request from the delivery device 230 to the delivery management device 244. In another example, the interactions may be triggered by the computer system 220. For instance, the computer system 220 may determine that the delivery device 230 may be within a geographical fence of the destination 240. Accordingly, the computer system 220 may instruct the delivery management device 244 to ping the passive device 210 (e.g., radiate a passive RFID tag with RF energy) and/or establish a communication link with the delivery device 230. Alternatively to using location information, the computer system 220 may estimate a time window within which the delivery device 230 may arrive to the destination 240 and may accordingly instruct the delivery management device 244 in order to initiate the interaction. In yet another example, the delivery management device 244 may trigger the interactions independently of the computer system. For instance, the delivery management device 244 may repeatedly generate a ping. Upon a response to a ping from the passive device 210, the delivery management device 244 may establish a communication link with the delivery device 230.

Once the interactions may be possible, different notifications may be generated. In an example, the notifications may be generated by the delivery management device 244 and/or the delivery device 230. In another example, the notifications may be generated by the computer system 220 in response to the interactions. Once generated, the notifications may be provided to the user device 260. In an example, the computer system 220 may send the notifications to the user device 260. In another example, the delivery management device 244 and/or the delivery device 230 may send the notifications to the user device 260 independently of the computer system 220.

The notifications may include an authorization of a drop-off of the item (or the holder 212), information about the drop-off, a lack of the drop-off, and/or information about a virtual signature related to the drop-off. In an example, the delivery management device 244 may access information from the passive device 210 (e.g., by reading the passive RFID tag). In another example, the delivery management device 244 may receive the information over a communication link with the delivery device 230. The information may identify the order, the item, the passive device 210, the delivery device 230, and/or the delivery management device 244. In turn, the delivery management device 244 (e.g., the delivery management module thereof) may access delivery information from the computer system 220 or from the user device 260 (e.g., upon a previous push or based on a request). The delivery information may similarly identify the order, the item, the passive RFID tag, and/or the delivery device 230 and may include delivery instructions (e.g., any needed signature of a user, delivery time window, special instructions, etc.). Based on a comparison, the delivery management device 244 may authorize (or reject) the delivery and accordingly transmit instructions to the delivery device 230. In response, the delivery device 230 may display the authorization (or lack thereof) and any delivery instructions to an operator or may provide such information to a computing device associated with a delivery vehicle.

The delivery instructions may provide information about the delivery of the item at the destination 240. The computer system 220 and/or the user device 260 may provide the delivery instructions to the delivery management device 244 and/or the delivery device 230. Different types of delivery instructions may exist. In an example, the delivery instructions may be defined at a user account level. For instance, the user device 260 may be associated with a user account. As part of setting up or updating the delivery management device 244 and/or the user account, the delivery instructions may be defined. In this example, the delivery instructions would apply to all deliveries unless indicated otherwise. In another example, the delivery instructions may be defined at an item level. For instance, the user may specify that for any time the item is ordered, the delivery instructions would be automatically applied. In yet another example, the delivery instructions may be defined at an order level. For instance, each time an order is made, specific delivery instructions may be defined for that order.

In addition, the delivery management device 244 and/or the computer system 220 may update the delivery instructions over time. In an example, the update may be based on an analysis of the history of deliveries. The analysis may include an optimization over one or more delivery-related parameters. For instance, the analysis may consider the history to determine a time frame and/or location at the destination 240 for dropping off the item. The time frame and/or location may reduce the risk of theft, loss, or damage to the item, increase the likelihood of a speedy pick-up, and/or increase the likelihood of the user being present at the time of the drop-off. To illustrate, if the history indicates that a first drop-off location within a first time frame may have resulted in past delivery thefts, but that a second drop-off location within a second time frame may have resulted in a successful delivery, the delivery instructions may be updated to schedule a delivery that may avoid the first drop-off location and first time frame and that may take advantage of the second drop-off location and second time frame. Similarly, if the history indicates that deliveries within a particular time frame, relative to other time frames, have resulted in a speedy pick-up or that the user may have been present at the destination 240, the delivery instructions may be updated to use the particular time frame.

In another example, the update to the delivery instructions may also or alternatively be based on an analysis of a history of deliveries, a history of delivery instructions, or delivery patterns within an area that may include the delivery location. The area may correspond to locations within a predetermined distance (e.g., relative to a threshold, such as a block, a hundred yards, etc.) from the delivery location. For instance, if the history indicates theft in the area, the delivery instructions may necessitate a signature of a person at the delivery location, provide information about a different, more secure location for the drop-off, and/or reject the delivery. Similarly, if a predefined delivery locker is in the area, the delivery instructions may default to delivering the item to that location if it is not possible or not safe to complete the delivery with respect to the delivery location.

Further, the delivery management device 244 and/or the computer system 220 may update the delivery instructions based on parameters of a current delivery. For example, if the current delivery was not successful (e.g., the item was not dropped-off or the item was stolen), the delivery instructions may be automatically updated to reschedule another delivery. In an example, the update may be based on the history of deliveries as described herein above. In another example, the update may be based on settings or preferences of the user account.

The detection of a drop-off may use the proximity of the delivery management device 244 to the passive device 210 and/or the delivery device 230. In an example, the delivery management device 244 may increase the RF ping rate. Upon receiving an RF response from the passive device 210 for a predefined period of time (e.g., for five minutes), a drop-off may have occurred. In another example, the weight sensor and/or the pressure sensor may sense the holder 212, which may indicate that a drop-off may have occurred. In another example, an input indicating a drop-off may be received at a user interface of the delivery management device 244. This input may be provided by an operator of the delivery device 230. In another example, a user interface (or some other interface) of the delivery device 230 may receive an indication of the drop-off (from the operator or from the delivery vehicle) and may send this indication to the delivery management device 244. In yet another example, by detecting the proximity of the passive device (e.g., based on the RF ping or the sensors) and by establishing the communication with the delivery device 230, the delivery management device 244 may detect the drop-off.

The detection of a lack of a drop-off may also use the proximity of the delivery management device 244 to the passive device 210 and/or the delivery device 230. In an example, upon a proximity of the delivery management device 244 and the delivery device 230, the delivery management device 244 may send an RF ping. If no response from the passive device 210 is received, the delivery management device 244 may detect that no drop-off has occurred. Accordingly, a notification about the lack of drop-off may be generated. In addition, in this case the delivery management device 244 may perform an automatic action. Such an action may be defined in the delivery instructions. For example, the delivery management device 244 may re-order the item with an expedited ship method, reschedule a delivery, or request a refund.

The virtual handoff may be detected based on interactions between the delivery management device 244 and the delivery device 230. For example, the delivery device 230 may request a virtual signature from the delivery management device 244. Upon detecting the drop-off, the delivery management device 244 may respond with the virtual signature. In another example, upon detecting the drop-off and once the communication with the delivery device 230 terminates (e.g., because of physical distance), the delivery management device 244 may determine that the virtual handoff may have occurred.

Subsequent to the delivery device 230 departing from the destination 240 and/or the termination of any communication with the delivery management device 244, notifications about movement, lack of movement, relevant environmental conditions, and/or a pick-up of the item (or the holder 212) may be provided. In an example, the delivery management device 244 may generate these notifications. In another example, the delivery management device 244 may provide relevant information to the computer system 220 to generate the notifications. Once generated, the user device 260 may receive the notifications from the computer system 220 and/or from the delivery management device 244 independently of the computer system 220.

Various techniques may be used to detect a movement of the item. In an example, RF ranging may be used. For example, the delivery management device 244 may estimate a proximity (e.g., a distance range) to the passive device 210 based on a response to an RF ping. If that proximity changes between two RF pings (e.g., based on signal strength of the RF signal response from the passive device 210), the movement may be detected. In addition, if an RF response is no longer received, the delivery management device 244 may detect that the item may have departed from the geographical fence of the destination 240 (unless a pick-up may have occurred). In another example, the weight and/or pressure sensors may be used to detect movement of the item. For instance, any change in the sensed data (e.g., pressure no longer sensed) may indicate that the item may have been moved.

In addition to movement, lack of movement may also be determined as a delivery event. A corresponding notification may be provided to the user device 260. For instance, if after drop-off, the item is not picked-up within a time period, a notification may be generated. The time period may be defined based on different parameters. An example parameter may include the item itself. For instance, if the item is a grocery item(s) (e.g., ice cream, a frozen entrée, or milk), that time frame may be shorter relative to other types of items. Similarly, if the item has a value that exceeds a threshold, the time frame may be shorter relative to less valuable items.

Similarly, various techniques may be used to detect an environmental condition that may impact the item. In an example, environmental sensors (e.g., rain or moisture sensors, humidity sensors, temperature sensors, light sensors, optical sensors, etc.) of the delivery management device 244 may detect the environmental condition. In another example, the delivery management device 244 may access environmental information about the location of the delivery management device 244 from a web site over the network 250 to determine the environmental condition. If this condition is detected prior to a pick-up, the delivery management device 244 may access (locally or remotely from the computer system 220) a recommendation related to the item delivery to be provided to the user device 260 (e.g., a recommendation for a pick-up within a time frame, to move the item to a covered area, etc.).

Various techniques may also be used to detect a pick-up. In one example, an indication of the pick-up may be received at a user interface of the delivery management device 244 or remotely from the user device 260. In another example, the pick-up may be determined based on the proximity between the delivery management device 244 and the user device 260. For instance, the computer system 220 may detect the proximity based on the GPS locations of the delivery management device 244 and the user device 260. Additionally or alternatively, the delivery management device 244 may receive the GPS location of the user device 260 from the computer system 220 or from the user device 260 independently of the computer system 220. Based on the proximity and a movement of the item, the delivery management device 244 may determine that a pick-up may have occurred.

The delivery management device 244 may also include or interface with optical sensors. The optical sensors may form an imaging device. The delivery management device 244 and/or the computer system 220 may trigger the imaging device to generate images upon detecting different delivery events. For example, upon detection of a drop-off, an image of the item being dropped off may be generated. Similarly, upon a movement or a pick-up, corresponding images may be generated. Such images may be stored locally at the delivery management device 244 and/or transmitted to the computer system 220 and/or the user device 260. For example, the images may be added to the notifications.

When optical sensors are used, various image recognition techniques, such as facial recognition techniques, may be optionally implemented. Such techniques may be implemented at the delivery management device 244 and/or the computer system 220. An image may be analyzed using facial recognition techniques to detect a success or a failure of a delivery event. For example, the delivery management device 244 may have access to an image of the user from, for example, the user account. Upon pick-up, the delivery management device 244 may analyze the corresponding image, detect a face of the individual who picked up the item, and compare the detected face to the known image of the user. If there is a match, the delivery management device 244 may determine that the pick-up may have been successful; otherwise, failure may be determined. A notification about the success or the failure may be provided to the user device 260.

As such, the passive device 210 may be used in conjunction with the delivery management device 244 and/or the delivery device 230 to facilitate various notifications to the user device 260. These notifications may span the entire delivery process, such as from the start of the delivery to the pick-up of the item at the destination 240, and may include information about different delivery events.

In addition to interfacing with the computer system 220, the delivery device 230, and/or the user device 260, the delivery management device 244 may interface with other nodes of the local area network 242 of the destination 240. These nodes may include various automation devices, e.g., connected or smart devices or appliances, installed at the destination 240. For example, the nodes may include a smart switch for turning on and off a light, a smart switch for turning on and off an oven, or other automation device. Upon a delivery event, the delivery management device 244 may indicate the delivery event to the one or more of the automation devices over the local area network 242. In response, an automation device may initiate an action at the destination 240. The action may be predefined by the user. For instance, upon drop-off of a frozen entrée, the delivery management device 244 may identify the item (e.g., the frozen entrée) based on the order and access instructions for preparing the item (e.g., cooking temperature) from a remote computing resource (e.g., from the computer system 220). The delivery management device 244 may inform a smart switch about the drop-off and some of the instructions for preparing the item (e.g., the cooking temperature). In turn, the switch may turn on an oven and set the bake temperature according to the information received from the delivery management device 244.

Generally, the delivery process may include multiple phases. At each phase, interactions between different components may be possible, thereby resulting in different notifications. FIG. 3 provides an illustrative table summarizing the phases, the interacting components, and the resulting notifications. Some of the interactions or information thereof may be tracked by a computer system and used to generate the notifications by the computer system and/or by one or more of the interacting components. As such, the computer system may be involved in the various phases but is not shown in FIG. 3 in the interest of clarity of explanation.

As illustrated, the delivery process may include four phases 310: preparation 312, in-route 314, drop-off 316, and pick-up 318. Other phases and/or combination of phases may also exist. At each phase, one or more interacting components 320 may be involved. The interactions may result in one or more end user notifications 330 and/or one or more delivery device notifications 340. The end user notifications 330 may be provided to a user device, such as the user device 260 of FIG. 2. In comparison, the delivery notifications 340 may be provided to a delivery device, such as the delivery device 230 of FIG. 2.

In the preparation phase 312, an order for an item may have been received and may be processed to prepare for the delivery. The computer system may provide instructions for including a passive device with the order or item. As such, the interacting components 320 may include the passive device. The end user notifications 330 and the delivery device notification 340 may describe that the order may be under processing.

In the in-route phase 314, the delivery may have started but a drop-off may not have occurred yet. For example, the item may have been loaded onto a delivery vehicle and the delivery vehicle may be in-route to a destination. As such, the interacting components 320 may include the passive device and the delivery device. As a result, the end user notifications 330 may indicate a start of the delivery and provide the location of the item while in-route. In comparison, the delivery device notifications 340 may include delivery instructions.

In the drop-off phase 316, the delivery device and the passive device may have arrived to the destination. Resulting interactions with a delivery management device may have resulted in a drop-off. As such, the interacting components 320 may include the passive device, the delivery device, and the delivery management device. The end user notifications 330 may indicate a completion and a time of drop-off. The end user notifications 330 may also describe a location of the item (e.g., the drop-off location) and any environmental conditions (including relevant recommendations). In comparison, the delivery device notifications 340 may include delivery instructions, such as the location of the delivery management device and any authorization therefrom for the drop-off. The delivery device notifications 340 may also include information about a virtual handoff.

In the pick-up phase 318, the delivery device may have departed the destination. However, additional interactions may occur between the passive device, the delivery management device, and/or the user device until a pick-up may have been detected. As such, the interacting components 320 may include the passive device, the delivery management device, and the user device. As a result, the end user notifications 330 may indicate a movement, a lack of movement (e.g., based on an elapsed time period), and/or a pick-up of the item. The end user notifications 330 may also describe a location of the item (e.g., the drop-off location) and any environmental conditions (including relevant recommendations). In comparison, the delivery device notifications 340 may similarly provide information about the movement, pick-up, and/or environmental conditions. Interactions and notifications with other devices may also exist. For example, the delivery management device may inform an automated device located at the destination of the drop-off, movement, and/or pick-up of the item.

As such, throughout the different phases of the delivery, meaningful notifications may be provided to the respective devices. As a result, the various involved parties may have access to the latest and most up-to-date information about the item (or the delivery thereof). In addition, because the notifications may be tailored based on the interactions, a sufficient or desired amount of notifications may be generated and transmitted, which may optimize the usage of the various computing resources.

FIG. 4 illustrates another embodiment for providing notifications. In this embodiment, an active device may be used instead of a passive device. Being active may reflect an implementation where the device may be self-powered and capable of performing various operations based on a local processor and memory. For example, an active device may represent a computing device with a suitable form factor for attachment to a holder of the item and for usage in the delivery of the item. By using an active device, much of the functionalities of a delivery management device may be pushed to the active device. Depending on the implementation of the active device, the delivery management device may not be even needed.

As illustrated in FIG. 4, a user device 410 may interact with a computing system 420 of an electronic marketplace over a network 430 to order an item for delivery to a destination 440. Notifications about the item, the order, and/or the delivery may be provided to the user device 410. As part of the delivery, a holder 450 may hold the item. An active device 452 may be attached to the holder. The active device 452 may interact with a delivery device 460 and a local area network 442 (or a computing node of such network). The interactions may result in the notifications to the user device 410.

In an example, the active device 452 may include a processor, memory, a wireless or wired interface, and a power source to facilitate the notifications. For instance, the active device 452 may include an active 802.11 RFID tag. Other configurations of the active device 452 may be used. For instance, the active device 452 may include additional hardware and/or software components, such as a GPS receiver, various sensors, and/or a delivery management module. In addition, the active device 452 may include an interface for attaching to the holder 450, such as an interface that may use adhesive surfaces, magnets, hook and loop fasteners, and/or other attachment means.

The local area network 442 may communicatively connect various computing nodes located at the destination 440 (e.g., inside or within a geographical fence of the destination 440). The local area network 442 may also be connected to the network 430 such that a communication path may exist between the computing nodes and the computer system 420, the user device 410, and/or the delivery device 460. These computing nodes may include, for example, an access point, a router, an intermediary computing device capable of tethering external computing devices (e.g., the active device 452) to the local area network 442, automated devices, imaging devices, and/or other computing resources.

To facilitate the interactions and thereby provide notifications, various tokens may be used between the active device 452, the local area network 442 (e.g. a computing node of the local area network 442), and the delivery device 460. Generally, a token may represent a secret that may be shared between computing devices to facilitate communications between the computing devices. The token may be revocable to facilitate the management of the communications. For example, the token may expire after a period of time or after a number of usages (e.g., one usage). As such, once the delivery may be complete, the token may no longer be usable.

In an example, upon the order for the item, a token may be generated and distributed to the proper computing devices. For example, the token may be generated by the computer system 420, the user device 410, and/or a computing node of the local area network 442. The same token, portions of the token, or a different token may be sent to the active device 452, the local area network 442 (e.g., the computing node thereof), and/or the delivery device 460. As shown in FIG. 4, a received token may be stored at the local area network 442 as a token 444, at the active device 452 as a token 454, and at the delivery device 460 as a token 462. The tokens 444, 454, 462 may be copies of the same token, different tokens, or portions of a same token.

In operation, the tokens 444 and 454 may be generated and distributed upon an order of an item. The token 462 may be similarly generated and distributed or may be a predefined token independently of the order. The tokens may be used to determine proximities between the different components. Notifications, including ones about delivery events, may be generated based on the proximities. In addition, delivery instructions may be provided from the computer system 420 and/or the user device 410 to the active device 452, the delivery device 460, and/or a computing node of the local area network 442 over the network 430. The delivery instructions may be similar to the ones described in connection with FIG. 2.

Upon a start of the delivery, the delivery device 460 may interact with the active device (e.g., read the RFID tag or exchange information over a communication link). The tokens 454 and 462 may, but need not, be used to authorize the start of the delivery. If the delivery device 460 does not have the delivery instructions, such instructions may be provided from the active device 452. In addition, a notification about the start of the delivery may be generated and provided to the user device 410. In an example, the active device 452 and/or the delivery device 460 may generate the notification. In another example, the communication between the active device 452 and the delivery device 460 may trigger the computer system 420 to generate the notification. Once generated, the notification may be sent to the user device 410 over the network 430. In an example, the computer system 420 may send the notification. In another example, the active device 452 and/or the delivery device 460 may send the notification independently of the computer system 420.

In route, the communication between the active device 452 and the delivery device 460 may be retained. For example, one or both of the devices 452 and 460 may ping each other and, accordingly, determine that the communication may still exist and that the two devices may be in proximity to each other. Based on this proximity, a notification to the user device 410 may be provided. The notification may indicate that the item may be in route and may show the geographical location of the item based on the location of the active device 452, the delivery device 460, and/or delivery vehicle. The active device 452, the delivery device 460, and/or the computer system 420 may generate and send the notification to the user device 410 over the network 430.

Upon arrival to the destination 440 (e.g., upon entry to a geographical fence of the destination 440), proximities between the local area network 442, the active device 452, and/or the delivery device 460 may be determined. These proximities may be used to authorize a drop-off, provide delivery instructions, detect a drop-off, detect a lack of a drop-off, and/or complete a virtual handoff. The proximities may be based on interactions between the local area network 442 (or a computing node thereof), the active device 452, and/or the delivery device 460. These interactions may be facilitated through communications that may use the tokens 444, 454, and 462. Upon occurrence of any of these events (e.g., authorization, drop-off, and/or virtual handoff), information about the event may be provided from the local area network 442 (or the computing node thereof), the active device 452, and/or the delivery device 460 to the computing system 420. A corresponding notification may also be sent to the user device 410 by the computer system 420 or independently of the computer system 420 (e.g., by the local area network 442 (or the computing node thereof), the active device 452, and/or the delivery device 460).

In an example, the active device 452 and the local area network 442 (or a computing node thereof) may establish a communication link based on the tokens 454 and 444. Similarly, the delivery device 460 and/or the local area network 442 (or the computing node thereof) may establish a communication link based on the tokens 462 and 444. In addition, a communication link may exist or be established between the active device 452 and the delivery device 460. This communication link may, but need not, use the tokens 454 and 462. Upon establishing communication with the local area network 442, the active device 452 may determine whether a drop-off may occur based on pre-stored delivery instructions or any other instructions received over the communication link (e.g., whether the correct item is in the delivery, the time of the delivery, any special drop-off instructions, etc.). If so, the active device 452 may authorize the drop-off for the delivery device 460 and provide relevant delivery instructions. Otherwise, the drop-off may be rejected.

The detection of a drop-off may use various proximity or interaction-based rules. In an example, if the local area network 442 (or the computing node thereof) and the active device 452 maintain communication for a predefined period of time (e.g., five minutes), the drop-off may be determined. In another example, a user interface (or some other interface) of the delivery device 460 may receive an indication of the drop-off (from the operator or from the delivery vehicle) and may send this indication to the local area network 442 (or the computing node thereof) and/or the active device 452. In yet another example, the rules may specify that the drop-off may have occurred if the communication between the local area network 442 (or the computing node thereof) and the active device 452 is maintained while the communication of the local area network 442 (or the computing node thereof) and/or the active device 452 with the delivery device 460 is terminated.

The detection of a lack of a drop-off may also use the various proximities. In an example, upon a proximity of the local area network 442 (or the computing node thereof) and the delivery device 460 but a lack of proximity between the local area network 442 (or the computing node thereof) and the active device 452, the local area network 442 (or the computing node thereof) may detect that no drop-off has occurred. Accordingly, a notification about the lack of drop-off may be generated. In addition, in this case the local area network 442 (or the computing node thereof) may perform an automatic action. Such an action may be defined in the delivery instructions. For example, the local area network 442 (or the computing node thereof) may re-order the item with an expedited ship method, reschedule a delivery, or request a refund.

The virtual handoff may be detected based on interactions of the active device 452 and/or the local area network 442 (or the computing node thereof) with the delivery device 460. For example, the delivery device 460 may request a virtual signature from the active device 452 and/or the local area network 442 (or the computing node thereof). Upon detecting the drop-off, the active device 452 and/or the local area network 442 (or the computing node thereof) may respond with the virtual signature. In another example, upon detecting the drop-off and once the communications with the delivery device 460 are terminated (e.g., because of physical distance), the delivery device 460, the active device 452, and/or the local area network 442 (or the computing node thereof) may determine that the virtual handoff may have occurred.

Subsequent to the delivery device 460 departing from the destination 440 and/or the termination of any communication with the active device 452 and/or the local area network 442 (or the computing node thereof), notifications about movement, lack of movement (e.g., based on an elapsed time period as described in connection with FIG. 2), relevant environmental conditions, and/or a pick-up of the item may be provided. Upon occurrence of any of these events (e.g., movement, an environmental condition, pick-up), information about the event may be provided from the local area network 442 (or the computing node thereof) and/or the active device 452 to the computing system 420. A corresponding notification may also be sent to the user device 410 by the computer system 420 or independently of the computer system 420 (e.g., by the local area network 442 (or the computing node thereof) and/or the active device 452).

Various techniques may be used to detect a movement of the item. In an example, RF ranging may be used. For example, the active device 452 and/or the local area network 442 (or the computing node thereof) may estimate a proximity (e.g., a distance) based on the communication between the two and the strength of the RF signal. If that proximity changes, the movement may be detected. In addition, if the communication terminates, the active device 452 and/or the local area network 442 (or the computing node thereof) may detect that the item may have departed from the geographical fence of the destination 440 (unless a pick-up may have occurred). In yet another example, the movement may be determined on GPS location of the active device 452. For instance, if the active device 452 includes a GPS receiver and the corresponding GPS data indicates a location change, the movement may be detected.

Similarly, various techniques may be used to detect an environmental condition that may impact the item. In an example, the active device 452 may include one or more environmental sensors (e.g., rain sensors). These sensors may detect the environmental condition. In another example, the local area network 442 (or the computing node thereof) or the computer system 420 may access environmental information about the destination 440 from a web site over the network 430 to determine the environmental condition.

If this condition is detected prior to a pick-up, the computer system 420, the active device 452, and/or the local area network 442 may provide a recommendation to the user device 410 related to the environmental condition (e.g., a recommendation for a pick-up within a time frame, to move the item to a covered area, etc.).

Various techniques may also be used to detect a pick-up. In one example, an indication of the pick-up may be received at a user interface of the active device 452 (if the device includes such an interface) or remotely from the user device 410. In another example, the pick-up may be determined based on the proximity of the user device 410 to the active device 452 and/or the local area network 442 (or the computing node thereof). For instance, the computer system 420 may detect the proximity based on the respective GPS locations. Additionally or alternatively, the active device 452 and/or the local area network 442 (or the computing node thereof) may receive the GPS location of the user device 410 from the computer system 420 or from the user device 410 independently of the computer system 420. Based on the proximity and a movement of the item, the pick-up may be detected.

The destination 440 may also include various optical sensors. The optical sensors may form an imaging device. The local area network 442 (or a computing node thereof) and/or the computer system 420 may trigger the imaging device to generate images upon detecting different delivery events including drop-off, movement, lack of movement, and/or pick-up. Such images may be stored locally at the local area network 442 and/or transmitted to the computer system 420 and/or the user device 410. For example, the images may be added to the notifications.

When optical sensors are used, various image recognition techniques, such as facial recognition techniques, may be optionally implemented. Such techniques may be implemented at local area network 442 (or a computing node thereof) and/or the computer system 420. An image may be analyzed using facial recognition techniques to detect a success or a failure of a delivery event. For example, the computer system 420 may have access to an image of the user from, for example, the user account. Upon pick-up, the computer system 420 may analyze the corresponding image, detect a face of the individual who picked up the item, and compare the detected face to the known image of the user. If there is a match, the computer system 420 may determine that the pick-up may have been successful; otherwise, failure may be determined. A notification about the success or the failure may be provided to the user device 410.

As such, the active device 452 may be used in conjunction with the local area network 442 and/or the delivery device 460 to facilitate various notifications to the user device 410. These notifications may span the entire delivery process, such as from the start of the delivery to the pick-up of the item at the destination 440.

In addition to interfacing with the local area network 442, the computer system 420, the delivery device 460, and/or the user device 410, the active device 452 may interact with other nodes of the local area network 442 through the local area network 442. These nodes may include various automation devices installed at the destination 440. For example, the nodes may include a smart switch for turning on and off a light, a smart switch for turning on and off an oven, or other automation device. Upon a delivery event, the active device 452 (or a computing node of the local area network 442) may indicate the delivery event to the one or more of the automation devices over the local area network 442. In response, an automation device may initiate an action at the destination 440, such as for instance turning on an oven based on a drop-off of a frozen entrée.

FIG. 5 provides an illustrative table summarizing different phases, interacting components, and the resulting notifications when an active device is used. Some of the interactions or information thereof may be tracked by a computer system and used to generate the notifications by the computer system and/or by one or more of the interacting components. As such, the computer system may be involved in the various phases but is not shown in FIG. 5 in the interest of clarity of explanation.

As illustrated, the delivery process may include four phases 510: preparation 512, in-route 514, drop-off 516, and pick-up 518. Other phases and/or combination of phases may also exist. At each phase, one or more interacting components 520 may be involved. The interactions may result in one or more end user notifications 530 and one or more delivery device notifications 540. The end user notifications 530 may be provided to a user device, such as the user device 410 of FIG. 4. In comparison, the delivery notifications 540 may be provided to a delivery device, such as the delivery device 460 of FIG. 4.

In the preparation phase 512, an order for an item may have been received and may be processed to prepare for the delivery. The computer system may provide instructions for including an active device with the order or item. These instructions may relate to the delivery and may include a token usable by the active device to access a local area network at the destination. As such, the interacting components 520 may include the active device, and the end user notifications 430 and the delivery device notifications 440 may describe that the order may be under processing. In this phase, the same or a different token may be provided to the delivery device for accessing the local area network 442 and/or the active device 452.

In the in-route phase 514, the delivery may have started but a drop-off may not have occurred yet. The interacting components 520 may include the active device and the delivery device. The end user notifications 530 may indicate a start of the delivery and provide the location of the item while in-route. In comparison, the delivery device notifications 540 may include delivery instructions. If no token may have been provided to the delivery device in the preparation phase 512, such a token may be provided from the active device or the computer system to the delivery device in the in-route phase 514.

In the drop-off phase 516, the delivery device and the active device may have arrived to the destination. Resulting interactions with the local area network (or a computing node thereof) may have resulted in a drop-off. As such, the interacting components 520 may include the active device, the delivery device, and the local area network (or the computing node thereof). The end user notifications 530 may indicate a completion and a time of drop-off. The end user notifications 530 may also describe a location of the item (e.g., the drop-off location based on a GPS receiver of the active device if one is used or based on user input at the delivery device) and any environmental conditions (including relevant recommendations). In comparison, the delivery device notifications 540 may include delivery instructions, such as the location of the delivery management device and any authorization therefrom for the drop-off. The delivery device notifications 540 may also include information about a virtual handoff.

In the pick-up phase 518, the delivery device may have departed the destination. However, interactions may occur between the active device, the local area network (or the computing node thereof), and/or the user device until a pick-up may have been detected. As such, the interacting components 520 may include the active device, the local area network (or the computing node), and the user device. The end user notifications 530 may indicate a movement, a lack of movement (e.g., based on an elapsed time period), and/or a pick-up of the item. The end user notifications 530 may also describe a location of the item (e.g., the drop-off location) and any environmental conditions (including relevant recommendations). In comparison, the delivery device notifications 540 may similarly provide information about the movement, pick-up, and/or environmental conditions. Interactions and notifications with other devices may also exist. For example, the active device and/or the local area network (or the computing node thereof) may inform an automated device located at the destination of the drop-off, movement, and/or pick-up of the item.

Figure 6:
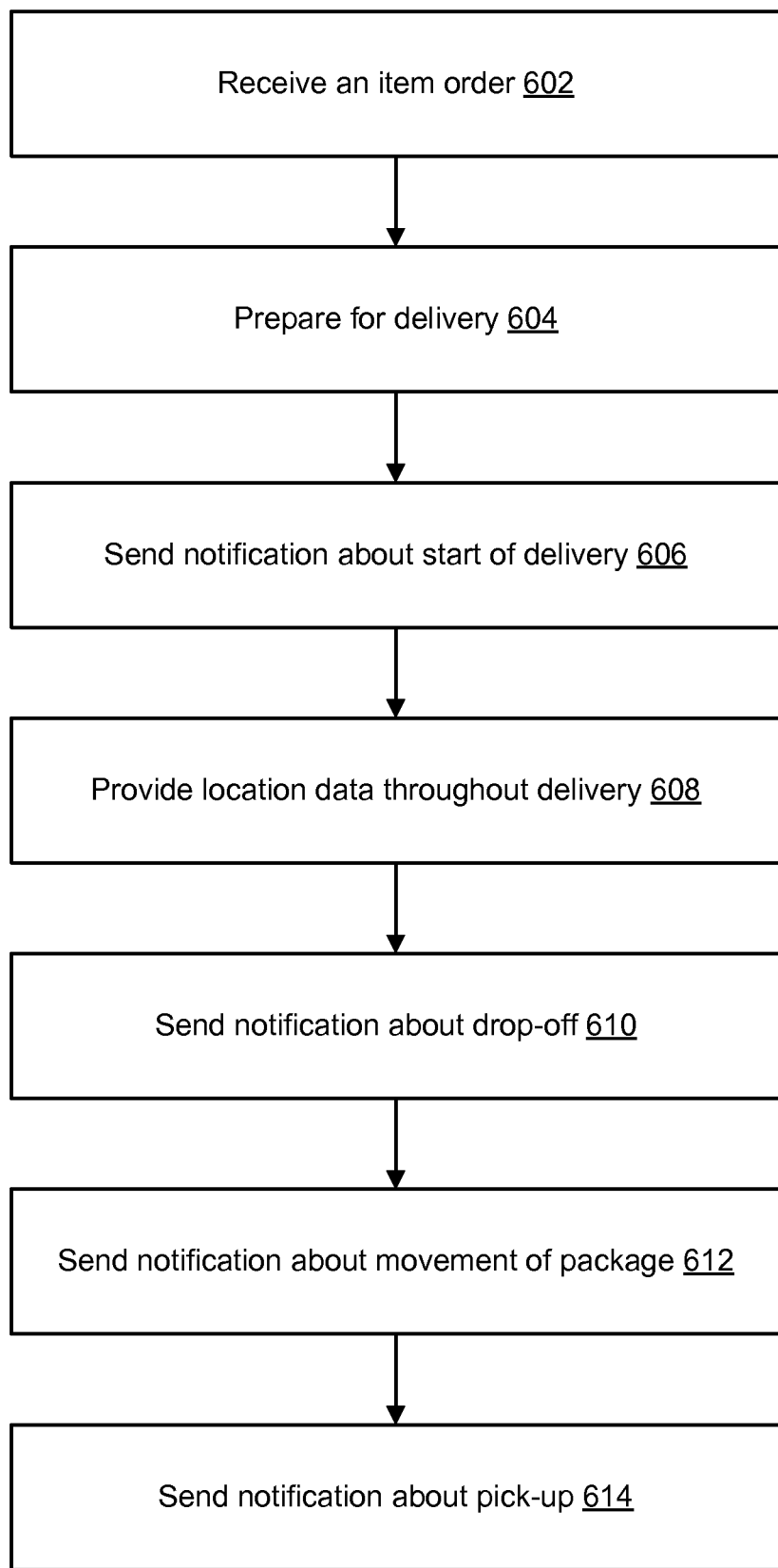
FIG. 6 illustrates an example flow for providing notifications, according to a particular embodiment.
Figure 7:
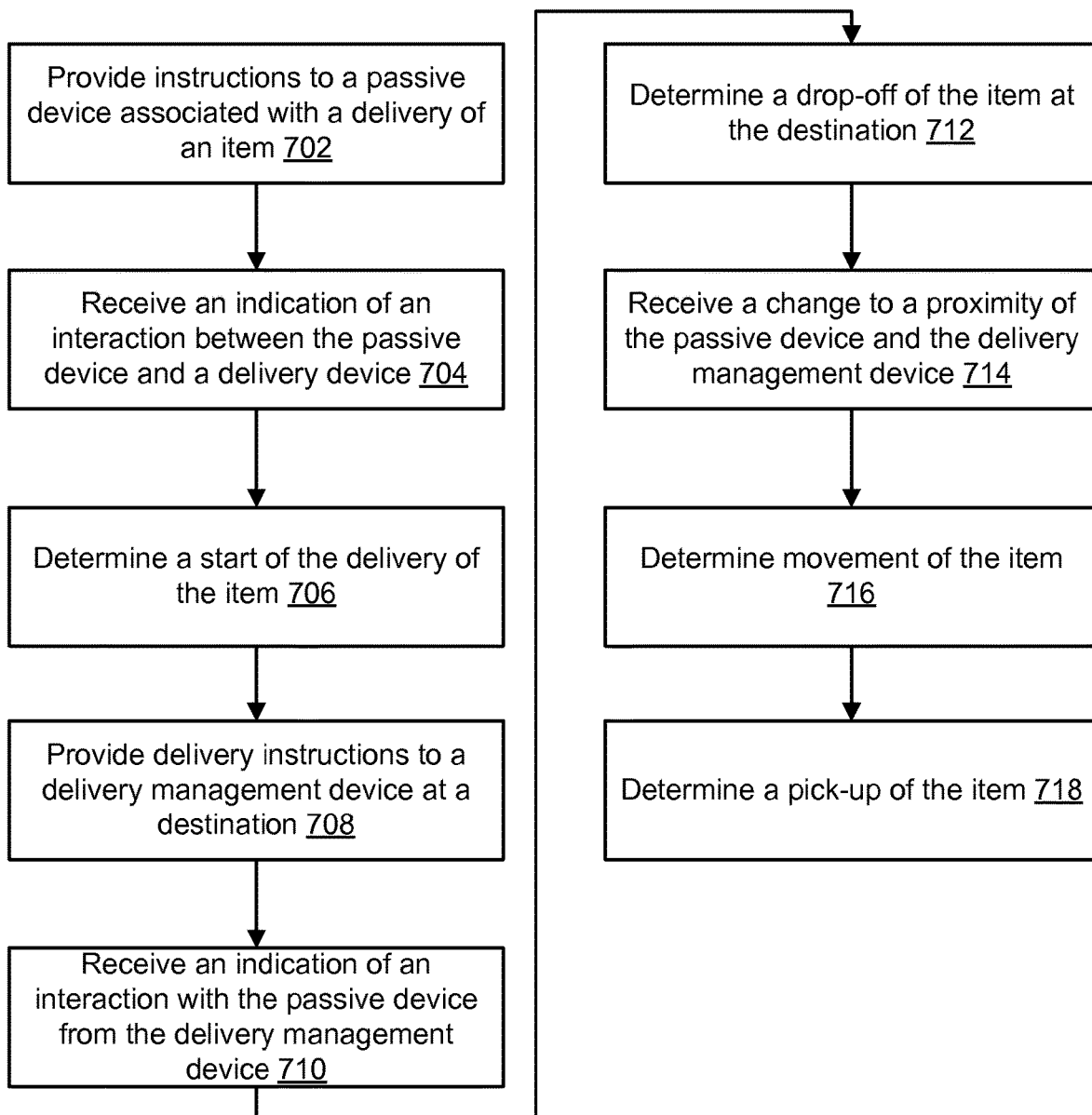
FIG. 7 illustrates an example flow for providing notifications in a computing environment utilizing a destination delivery management device, according to a particular embodiment.
Figure 8:
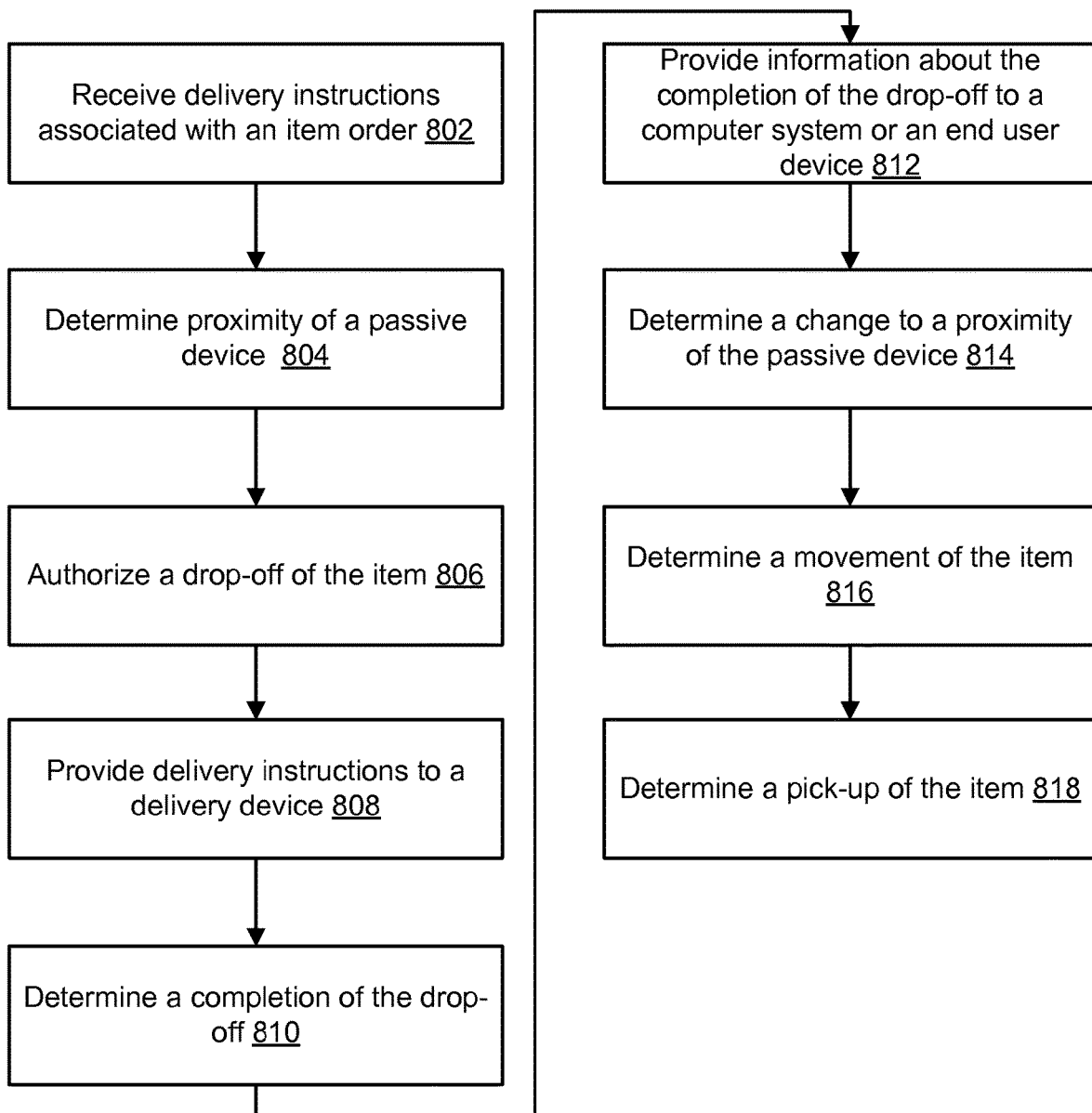
FIG. 8 illustrates another example flow for providing notifications in a computing environment utilizing a destination delivery management device, according to a particular embodiment.
Figure 9:
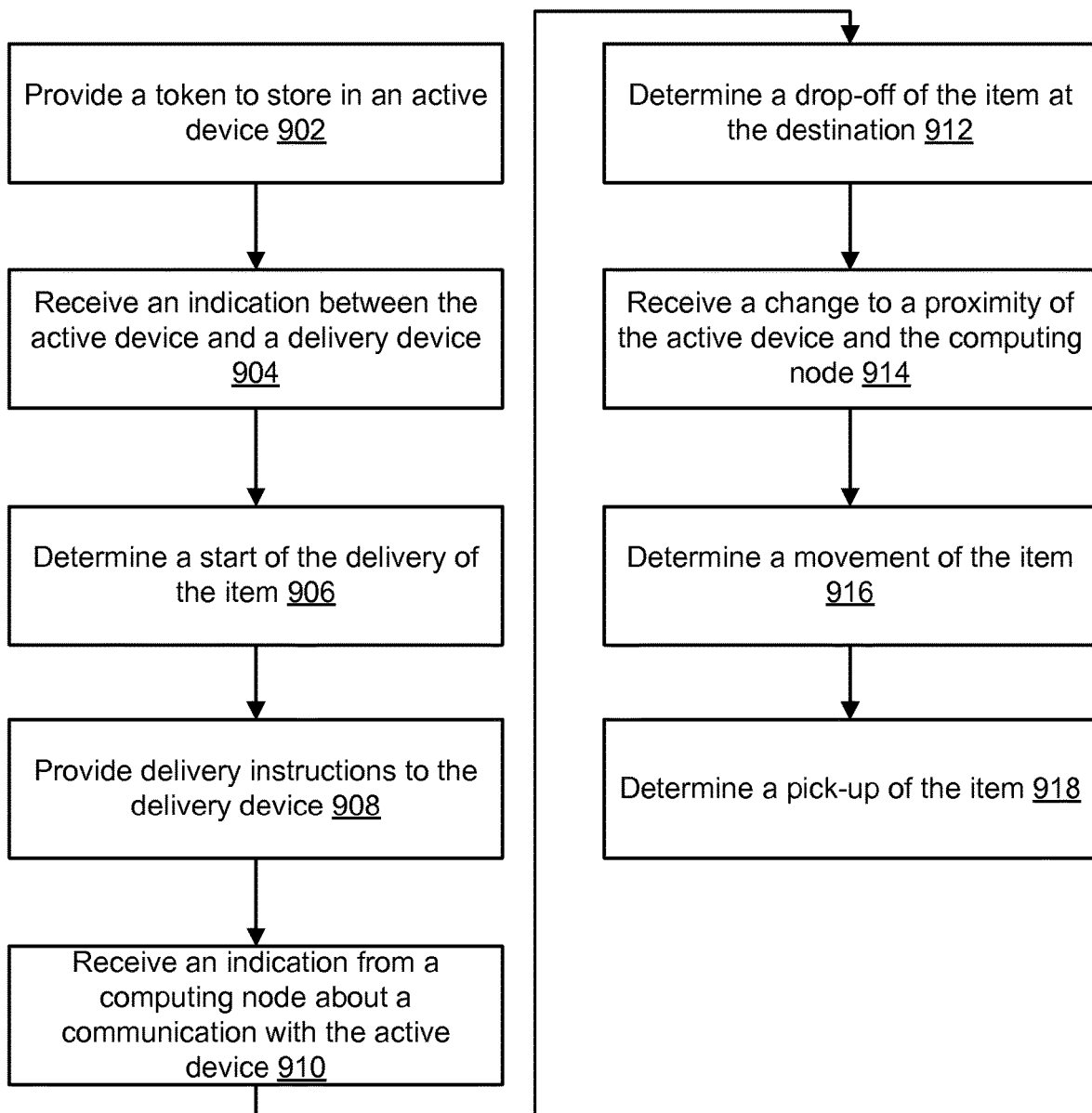
FIG. 9 illustrates an example flow for providing notifications in a computing environment utilizing an active device, according to a particular embodiment.
Figure 10:
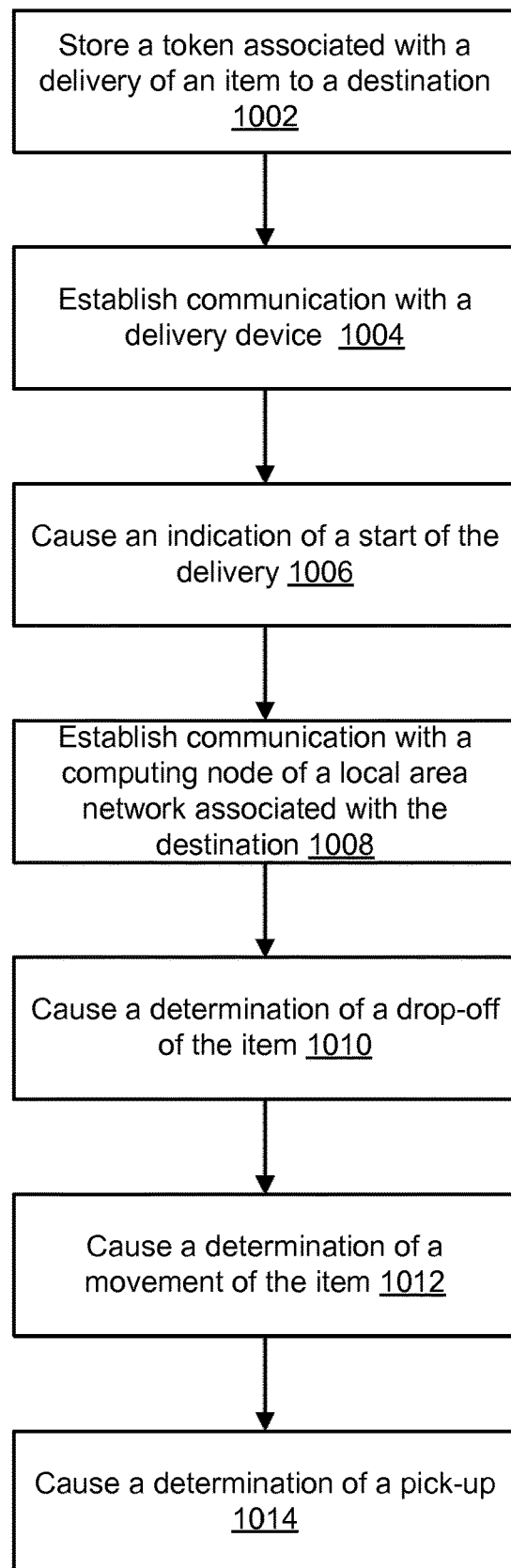
FIG. 10 illustrates another example flow for providing notifications in a computing environment utilizing an active device, according to a particular embodiment.

Turning to FIGS. 6-10 those figures illustrate example flows for managing notifications. FIG. 6 illustrates an example high level flow for generating and transmitting notifications. FIGS. 7 and 8 illustrate example flows that a computer system and a delivery management device, respectively, may implement to manage notifications in a computing environment that may include a passive device. In comparison, FIGS. 9 and 10 illustrate example flows that a computer system and an active device, respectively, may implement to manage notifications in a computing environment that may include the active device. Some of the operations of the example flows of FIGS. 6-10 may be similar. Such similarities are not repeated herein in the interest of clarity of explanation.

Further, in the illustrative operations, some of the operations or functions may be embodied in, and fully or partially automated by, modules executed by one or more processors. Also, while the operations are illustrated in a particular order, it should be understood that no particular order is necessary and that one or more operations may be omitted, skipped, and/or reordered.

The example flow of FIG. 6 may start at operation 602, where an order for an item may be received. For example, a user may operate a user device to access an electronic marketplace offering the item over a network. A computer system facilitating functionalities of the electronic marketplace may receive an order for the item from the user device. The computer system may also receive a description, such as an address, of a destination for a delivery of the item.

At operation 604, the delivery of the item may be prepared. For example, the computer system may provide instructions about the delivery. Depending on the implementations, the instructions may be used to configure a passive device and/or an active device that may be attached to a holder holding the item for the delivery. Configuring the passive device may include storing information about the order, the item, the destination, and/or the delivery instructions in the passive device, or in association with an identifier stored in the passive device. For example, a passive RFID tag encoding the information may be printed. Configuring the active device may include storing similar information at the active device, or in association with an identifier stored in the active device. In addition, a token for accessing a local area network associated with the destination may be stored in the active device, or in association with an identifier stored in the active device. An example active device may include an active 802.11 RFID tag.

At operation 606, a notification about a start of the delivery may be provided to the user device. For example, a delivery device may interact with the passive device and/or active device. The delivery device may be associated with a delivery vehicle. The interaction may depend on the implementation of such devices. For instance, RF-based communications may be used. Upon an interaction, the computer system may receive an indication of the interaction from the delivery device and/or the active device over a network. This indication may represent the start of the delivery. In addition, the computer system, the active device, and/or the delivery device may send the notification to the user device based on the interaction.

At operation 608, location data may be provided to the user device throughout the delivery up to arrival to the destination. For example, the passive device, the active device, the delivery device, and/or the delivery vehicle may include a location positioning device(s), such as a GPS receiver(s). The local positioning device(s) may provide the location data to the computer system. In turn, the computer system may facilitate access to the location data by the user device.

At operation 610, a notification about a drop-off of the item at the destination may be sent to the user device. If the passive device is used, a delivery management device may be located at the destination. Interactions of the delivery management device with the passive device and/or the delivery device may result in detecting the drop-off. In comparison, if the active device is used, a computing node of a local area network at the destination may interact with the active device and/or the delivery device. The interactions may be used to determine the drop-off. In both cases, the computer system may receive an indication of the drop-off from the delivery management device, the delivery device, the computing node of the local area network, and/or the active device. In addition, the computer system, the delivery management device, the delivery device, the computing node of the local area network, and/or the active device may send the corresponding notification to the user device.

At operation 612, a notification about movement of the item at the destination may be sent to the user device. If the passive device is used, the delivery management device may determine that the proximity between the delivery management device and the passive device may have changed. This change may correspond to the movement. The proximity determination may use different techniques, such as RF ranging (using an RF transceiver of the delivery management device), optical ranging (using an optical sensor of the delivery management device), and/or sensing weight and/or pressure changes (with weight and/or pressure sensors of the delivery management device). If the active device is used, the computing node of the local area network may determine that the proximity between the computing node and the active device may have changed. This change may correspond to the movement. The proximity determination may use different techniques, such as RF ranging (using an RF transceiver of the computing node), and/or using position location (e.g., GPS data of the active device). The computer system may receive an indication of the movement from the delivery management device, the delivery device, the computing node of the local area network, and/or the active device. In addition, the computer system, the delivery management device, the delivery device, the computing node of the local area network, and/or the active device may send the corresponding notification to the user device.

At operation 614, a notification about a pick-up of the item at the destination may be sent to the user device. Different techniques may be used to determine the pick-up. In an example, proximities may be used. For instance, proximity between the user device and the delivery management device and/or the computing node of the local area network may be determined (e.g., based on GPS data, RF ranging, etc.). This proximity may be compared to the proximity of the user device, the delivery management device, and/or the computing node of the local area network to the passive device and/or active device. The pick-up may be determined based on the comparison. For example, if the comparison indicates that the user device is in proximate location to the passive device and/or active device, the pick-up may have occurred. The computer system may receive an indication of the pick-up from the delivery management device, the delivery device, the computing node of the local area network, and/or the active device. In addition, the computer system, the delivery management device, the delivery device, the computing node of the local area network, and/or the active device may send the corresponding notification to the user device.

Turning to FIG. 7, the figure illustrates an example flow that the computer system may implement to manage the notifications when the passive device is used. The example flow may start at operation 702, where the computer system may provide instructions related to the passive device for the delivery of the item. The instructions may be used to, for instance, store the information about the delivery at the passive device, or in association with an identifier stored in the passive device. If a passive RFID tag is used, the instructions may be used to print such a tag.

At operation 704, the computer system may receive an indication of an interaction between the passive device and the delivery device. For example, the delivery device may read, scan, or radiate with RF signals the passive device and may accordingly transmit the indication to the computer system. At operation 706, the computer system may determine a start of the delivery based on the received indication. In addition, the computer system may transmit a notification about the start to the user device.

At operation 708, the computer system may provide delivery instructions to the delivery management device. Similar instructions may also be provided to the delivery device. In an example, upon the order of the item, the user device may also specify particular instructions about the delivery of the item (e.g., specific location at the destination, delivery time, requested signatures, etc.). In response, the computer system may generate and send the delivery instructions to the delivery management device and/or the delivery device.

At operation 710, the computer system may receive an indication of an interaction between the delivery management device and the passive device. For example, the delivery management device may send an indication, to the computer system, that the passive device may be in proximity of the delivery management device. In addition, the computer system may receive a similar indication from the delivery device (or the delivery management device) about a proximity to the delivery management device (or the delivery device).

At operation 712, the computer system may determine that a drop-off may have occurred at the destination. This determination may be based on one or more of the received indications. For example, the computer system may determine that a potential drop-off may have occurred based on the proximity of the delivery management device and the passive device. The computer system may confirm this potential drop-off using various techniques. For example, after a predefined period of time, if that proximity is maintained (e.g., based on another indication received from the delivery management device), the confirmation may be made. In another example, the confirmation may be made based on the indication of the proximity of the delivery device and the delivery management device. In yet another example, the computer system may receive the indications of proximities between the delivery management device, the delivery device, and the passive device. If, after a predefined period of time, the delivery device is no longer located in proximity of the delivery management device, the confirmation may be made. The computer system may accordingly send a notification about the drop-off to the user device.

At operation 714, the computer system may receive a change to the proximity between the passive device and the delivery management device. For example, the delivery management device may detect the change and send an indication of the change to the computer system. At operation 716, the computer system may determine movement of the item based on the change. The computer system may accordingly send a notification about the movement to the user device.

At operation 718, the computer system may determine a pick-up of the item. For example, the computer system may receive an indication from the user device of the pick-up. In another example, proximities of the delivery management device, the passive device, and the user device may be used to detect the pick-up. For example, the computer system may access the position location (e.g., GPS data) of the user device and the delivery management device. If the two devices may be proximate to each other, the computer system may access (e.g., request and receive or automatically receive) an indication from the delivery management device of movement of the item. The computer system may detect the pick-up based on such proximities and the movement.

Turning to FIG. 8, the figure illustrates an example flow that the delivery management device may implement to manage the notifications when the passive device is used. The example flow may start at operation 802, where the delivery management device may receive delivery instructions associated with the order of the item. The delivery instructions may be received from the computer system and/or the user device and may provide information about the order. For example, the information may include a unique identifier associated with the order.

At operation 804, the delivery management device may determine a proximity to the passive device. This proximity may be determined based on interactions with the passive device and/or the delivery device. The interaction may include receiving information about the order, e.g., from the passive device, or based on information stored in association with an identifier in the passive device.

At operation 806, the delivery management device may authorize a drop-off of the item. For example, the delivery management device may compare the information received from the passive device and/or the delivery device to the information received from the computer system and/or user device. If an acceptable match is found (e.g., the unique identifier associated with the order is the same), the drop-off may be authorized. The delivery instructions may also include, for instance, a delivery time frame and/or environmental conditions (e.g., drop-off to occur when there is no rain). The delivery management device may further authorize the drop-off based on the delivery time frame and/or the environmental conditions. Once authorized, the delivery management device may send an indication of the authorization to the computer system and/or the delivery device. In addition, the delivery management device and/or the computer system may send a corresponding notification to the user device.

At operation 808, the delivery management device may provide a portion of the delivery instructions to the delivery device. For example, the delivery instructions may include a specific location to drop-off the item at the location. As such, the delivery management device may identify this location to the delivery device.

At operation 810, the delivery management device may determine a completion of the drop-off. This determination may be made based on proximity of the delivery management device to the passive device and/or the delivery device. For example, if the passive device remains in proximity of the delivery management device for a predefined period of time, the completion of the drop-off may be detected. In another example, if the delivery device is no longer in proximity of the delivery management device, the completion of the drop-off may be detected.

At operation 812, the delivery management device may provide information about the completion of the drop-off to the computer system, the delivery device and/or the user device. For example, the delivery management device may send an indication of the completion of the drop-off to the computer system and/or the delivery device. In addition, the delivery management device and/or the computer system may send a corresponding notification to the user device.

At operation 814, the delivery management device may determine a change to the proximity between the delivery management device and the passive device. At operation 816, the delivery management device may determine movement of the item based on the change to the proximity. The delivery management device may send an indication of the movement to the computer system. In addition, the delivery management device and/or the computer system may send a corresponding notification to the user device.

At operation 818, the delivery management device may determine a pick-up of the item. The pick-up may be determined based on the proximity (or lack thereof) to the passive device. For instance, if the passive device is no longer at a location proximate to the delivery management device, the pick-up may be determined. In addition, the pick-up may be determined based on the proximity to the user device. For example, the delivery management device may determine the location of the user device (e.g., based on GPS data of the user device, where the GPS data may be received from the user device or the computer system). If the user device and the passive device are proximate to the delivery management device at one point in time after which both devices are no longer proximate to the delivery management device, the pick-up may be detected. The delivery management device may send an indication of the pick-up to the computer system. In addition, the delivery management device and/or the computer system may send a corresponding notification to the user device.

Turning to FIG. 9, the figure illustrates an example flow that the computer system may implement to manage the notifications when the active device is used. The example flow may start at operation 902, where the computer system may provide a token for storage at the active device. The token may be generated by the computer system, the user device, and/or a computing node of the local area network of the destination based on the order of the item.

At operation 904, the computer system may receive an indication of an interaction between the active device and the delivery device. For example, the delivery device may read, scan, or establish data communication with the active tag and may accordingly transmit the indication to the computer system. At operation 906, the computer system may determine a start of the delivery based on the received indication. In addition, the computer system may transmit a notification about the start to the user device.

At operation 908, the computer system may provide delivery instructions to the delivery device. At operation 910, the computer system may receive an indication from the computing node of the local area network about the communication with the active device. The communication may be based on the token. For example, the computing node may receive the token from the active device and, accordingly, authenticate the active device. The computing node may send an indication of the communication to the computer system. In addition, the computer system may receive an indication of a communication between the delivery device and the computing node. This communication may also be based on a same or a different token. The indication of the communication may be received from the delivery device and/or the computing node.

At operation 912, the computer system may determine that a drop-off may have occurred at the destination. This determination may be based on one or more of the received indications. For example, the computer system may determine that a potential drop-off may have occurred based on the communication of the computing node and the active device. The computer system may confirm this potential drop-off using various techniques. For example, the drop-off may be confirmed based on the communication between the delivery device and the computing node, or based on the termination of such a communication (which may be received in another indication from the delivery device and/or the computing node). In another example, the drop-off may be determined based on the proximity of the active device to the destination. For instance, the computer system may receive the location information (e.g., GPS data) of the active device and may compare the location information to the one of the destination. If the active device remains within a geographical fence of the destination for a predefined period of time, the drop-off may have occurred. In yet another example, the drop-off may be determined based on the proximity of the delivery device to the destination. For instance, the computer system may receive the location information (e.g., GPS data) of the delivery device and may compare the location information to the one of the destination. If the delivery device enters and then leaves the geographical fence while the communication between the computing node and the active device persists, the drop-off may be complete.

At operation 914, the computer system may receive a change to the proximity between the active device and the delivery management device. For example, the computer system may receive the location information (e.g., GPS data) of the active device and may compare the location information to the one of the destination. If there is a change in the location information, that change may correspond to the proximity change. At operation 916, the computer system may determine movement of the item based on the change. The computer system may accordingly send a notification about the movement to the user device.

At operation 918, the computer system may determine a pick-up of the item. For example, the computer system may receive an indication from the user device of the pick-up. In another example, proximities of the computing node, the active device, and the user device may be used to detect the pick-up. For example, the computer system may access the location information (e.g., GPS data) of the computing node, the active device, and the user device to determine the proximities and accordingly detect the pick-up.

Turning to FIG. 10, the figure illustrates an example flow that the active device may implement to manage the notifications. The example flow may start at operation 1002, where the active device may store the token associated with the item delivery. The token may be received from the computer system, a computing node of the local area network of the destination, and/or the user device.

At operation 1004, the active device may establish communication with the delivery device. At operation 1006, the active device may cause an indication of the start of the delivery. For example, the communication may cause the delivery device and/or the active device to send the indication to the computer system. In addition, the computer system, the delivery device, and/or the active device may send a corresponding notification to the user device.

At operation 1008, the active device may establish communication with the computing node of the local area network. This communication may be established based on an authentication of the active device using the token.

At operation 1010, the active device may cause a determination of a drop-off of the item. The drop-off may be determined based on proximity of the active device to the computing node and/or the delivery device. Based on this proximity, the active device, the computing node, the delivery device, and/or the computer system may determine that the drop-off may have occurred. A corresponding notification may be sent to the user device and/or the delivery device. In an example, the active device may provide its location information (e.g., GPS data) to the computer system and/or the computing node or may receive the location information of the destination. Based on a comparison of the location information, the proximity may be determined. In another example, the computing node and/or the active device may use RF ranging to detect the proximity. This proximity may be used with other factors to determine a completion of the drop-off. For example, if the active device and the computing node remain in proximity for a predefined period of time, the drop-off may be complete. In another example, if the delivery device is no longer in proximity to the active device, the drop-off may be complete.

At operation 1012, the active device may cause a determination of a movement of the item. The movement may be determined based on proximity of the active device to the computing node. Based on this proximity, the active device, the computing node, and/or the computer system may determine that the movement may have occurred. A corresponding notification may be sent to the user device. In an example, a change in the location information of the active device relative to destination may indicate the movement of the item. In another example, RF ranging may be applied based on the communication between the active device and the computing node. The RF ranging may indicate a change in a distance range between the active device and the computing node. This change may correspond to the movement of the item.

At operation 1014, the active device may cause a determination of a pick-up of the item. The pick-up may be determined based on proximity between the active device, the computing node, and/or the user device. Based on this proximity, the active device, the computing node, and/or the computer system may determine that the pick-up may have occurred. A corresponding notification may be sent to the user device. In an example, if the user device moves to a location proximate to the active device, the pick-up may be determined.

Figure 11:
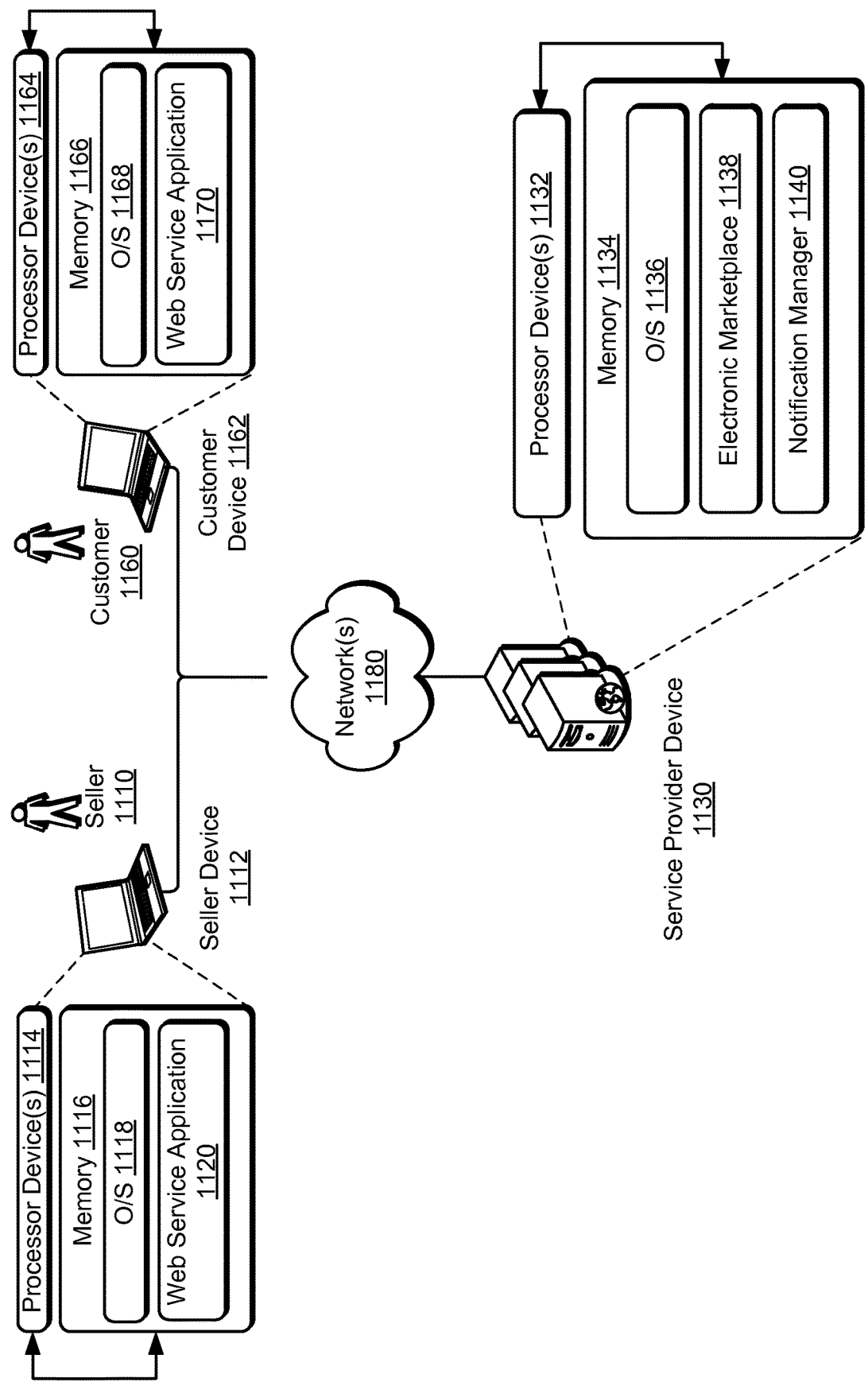
FIG. 11 illustrates example end-to-end architecture for facilitating an electronic marketplace, according to a particular embodiment.

Turning to FIG. 11, that figure illustrates an example end-to-end computing environment for managing notifications in connection with an electronic marketplace. In this example, a service provider may implement a notification manager to manage the notifications. The notifications may relate to items available from the electronic marketplace. The items may be listed for offering by a seller 1110 and/or the service provider and may be available for ordering by a customer 1160.

In a basic configuration, the seller 1110 may utilize a seller device 1112 to access local applications, a web service application 1120, a seller account accessible through the web service application 1120, a web site or any other network-based resources via one or more networks 1180. In some aspects, the web service application 1120, the web site, and/or the seller account may be hosted, managed, and/or otherwise provided by one or more computing resources of the service provider, such as by utilizing one or more service provider devices 1130. The seller 1110 may use the local applications and/or the web service application 1120 to interact with the network-based resources of the service provider and perform seller-related transactions. These transactions may include, for example, offering items for sale.

In some examples, the seller device 1112 may be any type of computing devices such as, but not limited to, a mobile phone, a smart phone, a personal digital assistant (PDA), a laptop computer, a thin-client device, a tablet PC, etc. In one illustrative configuration, the seller device 1112 may contain communications connection(s) that allow the seller device 1112 to communicate with a stored database, another computing device or server, seller terminals, and/or other devices on the networks 1180. The seller device 1112 may also include input/output (I/O) device(s) and/or ports, such as for enabling connection with a keyboard, a mouse, a pen, a voice input device, a touch input device, a display, speakers, a printer, etc.

The seller device 1112 may also include at least one or more processing units (or processor device(s)) 1114 and at least one memory 1116. The processor device(s) 1114 may be implemented as appropriate in hardware, computer-executable instructions, firmware, or combinations thereof. Computer-executable instructions or firmware implementations of the processor device(s) 1114 may include computer-executable or machine-executable instructions written in any suitable programming language to perform the various functions described.

The memory 1116 may store program instructions that are loadable and executable on the processor device(s) 1114, as well as data generated during the execution of these programs. Depending on the configuration and type of seller device 1112, the memory 1116 may be volatile (such as random access memory (RAM)) and/or non-volatile (such as read-only memory (ROM), flash memory, etc.). The seller device 1112 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1116 may include multiple different types of memory, such as static random access memory (SRAM), dynamic random access memory (DRAM), or ROM.

Turning to the contents of the memory 1116 in more detail, the memory may include an operating system (O/S) 1118 and the one or more application programs or services for implementing the features disclosed herein including the web service application 1120. In some examples, the seller device 1112 may be in communication with the service provider devices 1130 via the networks 1180, or via other network connections. The networks 1180 may include any one or a combination of many different types of networks, such as cable networks, the Internet, wireless networks, cellular networks, and other private and/or public networks. While the illustrated example represents the seller 1110 accessing the web service application 1120 over the networks 1180, the described techniques may equally apply in instances where the seller 1110 interacts with the service provider devices 1130 via the seller device 1112 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 1160 may utilize customer device 1162 to access local applications, a web service application 1170 (or some other mobile application such as a "mobile app" available from an application store), a customer account accessible through the web service application 1170, a web site, or any other network-based resources via the networks 1180. In some aspects, the web service application 1170, the web site, and/or the user account may be hosted, managed, and/or otherwise provided by the service provider devices 1130 and may be similar to the web service application 1120, the web site accessed by the computing device 1112, and/or the seller account, respectively.

The customer 1160 may use the local applications and/or the web service application 1170 to conduct transactions with the network-based resources of the service provider. These transactions may include, for example, browsing for items, viewing items, ordering items, reviewing items, returning items, receiving notifications, viewing notifications, dismissing notifications, and/or other transactions.

In some examples, the customer device 1162 may be configured similarly to the seller device 1112 and may include at least one or more processing units (or processor device(s)) 1164 and at least one memory 1166. The processor device(s) 1164 may be implemented as appropriate in hardware, computer-executable instructions, firmware, or combinations thereof similarly to the processor device(s) 1114. Likewise, the memory 1166 may also be configured similarly to the memory 1116 and may store program instructions that are loadable and executable on the processor device(s) 1164, as well as data generated during the execution of these programs. For example, the memory 1166 may include an operating system (O/S) 1168 and the one or more application programs or services for implementing the features disclosed herein including the web service application 1170.

As described briefly above, the web service applications 1120 and 1170 may allow the seller 1110 and customer 1160, respectively, to interact with the service provider devices 1130 to conduct transactions involving items. The service provider devices 1130, perhaps arranged in a cluster of servers or as a server farm, may host the web service applications 1120 and 1170. These servers may be configured to host a web site (or combination of web sites) viewable via the computing devices 1112 and 1162. Other server architectures may also be used to host the web service applications 1120 and 1170. The web service applications 1120 and 1170 may be capable of handling requests from many sellers 1110 and customers 1160, respectively, and serving, in response, various interfaces that may be rendered at the computing devices 1112 and 1162 such as, but not limited to, a web site. The web service applications 1120 and 1170 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1120 and 1170, such as with other applications running on the computing devices 1112 and 1162, respectively.

The service provider devices 1130 may, in some examples, provide network-based resources such as, but not limited to, applications for purchase and/or download, web sites, web hosting, client entities, data storage, data access, management, virtualization, etc. The service provider devices 1130 may also be operable to provide web hosting, computer application development, and/or implementation platforms, or combinations of the foregoing to the seller 1110 and customer 1160.

The service provider devices 1130 may be any type of computing device such as, but not limited to, a mobile phone, a smart phone, a personal digital assistant (PDA), a laptop computer, a desktop computer, a server computer, a thin-client device, a tablet PC, etc. The service provider devices 1130 may also contain communications connection(s) that allow service provider devices 1130 to communicate with a stored database, other computing devices or servers, seller terminals, and/or other devices on the network 1180. The service provider devices 1130 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 1130 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1130 may be in communication with the computing devices 1112 and 1162 via the networks 1180, or via other network connections. The service provider devices 1130 may include one or more servers, perhaps arranged in a cluster, or as individual servers not associated with one another.

In one illustrative configuration, the service provider devices 1130 may include at least one or more processing units (or processor devices(s)) 1132 and at least one memory 1134. The processor device(s) 1132 may be implemented as appropriate in hardware, computer-executable instructions, firmware, or combinations thereof. Computer-executable instruction or firmware implementations of the processor device(s) 1132 may include computer-executable or machine-executable instructions written in any suitable programming language to perform the various functions described.

The memory 1134 may store program instructions that are loadable and executable on the processor device(s) 1132, as well as data generated during the execution of these programs. Depending on the configuration and type of the service provider devices 1130, the memory 1134 may be volatile (such as random access memory (RAM)) and/or non-volatile (such as read-only memory (ROM), flash memory, etc.). The service provider devices 1130 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1134 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1134 in more detail, the memory may include an operating system (O/S) 1136, code for an electronic marketplace 1138 and code for a notification manager 1140. The notification manager 1140 may be configured to provide notification functionalities to the seller device 1112 and the customer device 1162. These functionalities may be based on interactions with delivery devices, active devices, passive devices, delivery management devices, and/or computing nodes of local area networks.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a computer system associated with an electronic marketplace, the computer system configured to provide notifications to a user device about a delivery of an item to a destination associated with the user device, the item available from the electronic marketplace; and
   an active tag configured to attach to a holder of the item for the delivery, the active tag storing a token associated with the delivery, the token configured to facilitate a communication between the active tag and a node of a local area network associated with the destination, wherein:
   the computer system generates a first notification for the user device about a loading of the item on a delivery vehicle, the first notification based at least in part on a first communication link between the active tag and a delivery device associated with the delivery vehicle, and
   the computer system generates a second notification for the user device about a drop-off of the item at the destination, the second notification based at least in part on a second communication link between the active tag and the node of the local area network and on a determination that the second communication link was maintained for a pre-defined period of time, the second communication link established based at least in part on a transmission of the token by the active tag to the node and on an authentication of the active tag by the node, the authentication using the token.

2. The system of claim 1, wherein the computer system is configured to provide the token to the active tag based at least in part on an order for the item at the electronic marketplace.

3. The system of claim 1, wherein the second notification about the drop-off is further based at least in part on a third communication link between the delivery device and the node of the local area network.

4. The system of claim 1, wherein the computer system generates a third notification for the user device about a movement of the item at the destination, the third notification based at least in part on a change of a proximity between the active tag and the node.

5. A computer-implemented method, comprising:
providing, by a computer system to an active device, a token associated with a delivery of an item to or from a location, the active device attached to at least one of the item or a holder of the item for the delivery;
receiving, by the computer system from a delivery device associated with a delivery vehicle, an identifier associated with the active device based at least in part on a proximity of the active device and the delivery device;
determining, by the computer system, a start of the delivery based at least in part on receiving the identifier;
providing, by the computer system to a user device associated with the delivery, information about the start of the delivery;
receiving, by the computer system from a node of a local area network associated with at the location, an indication about an event that is associated with the delivery at the location, the indication based at least in part on a communication link between the active device and the node and on a determination that the communication link was maintained for a pre-defined period of time, the communication link established based at least in part on a transmission of the token by the active device to the node and on an authentication of the active device by the node, the authentication using the token; and
providing, by the computer system to the user device associated with the delivery, information the indication about the event.

6. The computer-implemented method of claim 5, wherein the event comprises a drop-off, and the method further comprising:
receiving a second indication about the drop-off from the delivery device; and
determining a completion of the drop-off based at least in part on the indication from the node of the local area network and the second indication from the delivery device.

7. The computer-implemented method of claim 5, wherein the event comprises at least one of: a drop-off, a lack of drop-off, a movement, a lack of movement, or a pick-up, and the method further comprising determining a completion of the event based at least in part on a set of rules associated with communications between the active device, the node of the local area network, and the delivery device.

8. The computer-implemented method of claim 5, further comprising:
receiving an image associated with event;
determining a completion of the event based at least in part on the image; and providing, by the computer system to the user device associated with the delivery, information about the completion of the event comprising the image.

9. The computer-implemented method of claim 5, further comprising determining a movement of the item based at least in part on a change of a proximity between the active device and the node of the local area network, the proximity based at least in part on the communication link between the active device and the node of the local area network.

10. One or more non-transitory computer-readable storage media storing instructions that, upon execution on a system, cause the system to perform operations comprising:
providing, to an active device, a token associated with a delivery of an item to or from a location, the active device attached to at least one of the item or a holder of the item for the delivery;
receiving, from a delivery device associated with a delivery vehicle, an identifier associated with the active device based at least in part on a proximity of the active device and the delivery device;
determining a start of the delivery based at least in part on receiving the identifier;
providing, to a user device associated with the delivery, information about the start of the delivery;
receiving, from a node of a local area network at the location, an indication about an event that is associated with the delivery at the location, the indication based at least in part on a communication link between the active device and the node and on a determination that the communication link was maintained for a pre-defined period of time, the communication link established based at least in part on a transmission of the token by the active device to the node and on an authentication of the active device by the node, the authentication using the token; and
providing, to the user device associated with the delivery, the indication about the event.

11. The one or more non-transitory computer-readable storage media of claim 10, wherein the event comprises a drop-off of the item at the location, wherein the item is ordered from an electronic marketplace, wherein the system is associated with the electronic marketplace.

12. The one or more non-transitory computer-readable storage media of claim 10 storing further instructions that, upon execution on the system, cause the system to perform additional operations comprising:
receiving, from at least one of the node or the delivery device, communication data indicating another communication link between the active device and the delivery device, wherein the event is determined further based at least in part on the communication data.

13. The one or more non-transitory computer-readable storage media of claim 10 storing further instructions that, upon execution on the system, cause the system to perform additional operations comprising:
providing, to the active device, instructions associated with the delivery.

14. The one or more non-transitory computer-readable storage media of claim 13, wherein the indication of the event is based at least in part on the instructions.

15. The one or more non-transitory computer-readable storage media of claim 10 storing further instructions that, upon execution on the system, cause the system to perform additional operations comprising:
providing, to the node of the local area network, instructions associated with the delivery.

16. The one or more non-transitory computer-readable storage media of claim 15, wherein the instructions are based on at least one of: a history of past deliveries to the location, or a delivery pattern associated with other locations within a predetermined distance from the location.

17. The one or more non-transitory computer-readable storage media of claim 10, wherein the token is configured for expiration based at least in part on one or more of: a pick-up of the item or a pre-defined time period from a time of a drop-off of the item.

18. The one or more non-transitory computer-readable storage media of claim 10 storing further instructions that, upon execution on the system, cause the system to perform additional operations comprising:
 receiving location data from the active device via the node of the local area network, wherein the indication about the event comprises the location data.

19. The one or more non-transitory computer-readable storage media of claim 10, storing further instructions that, upon execution on the system, cause the system to perform additional operations comprising:
 generating a second token based at least in part on an order for the item; and
 sending the second token to the active device.

20. The one or more non-transitory computer-readable storage media of claim 19, wherein the authentication uses the second token.

\* \* \* \* \*